United States Patent [19]

Hasegawa et al.

[11] Patent Number: 4,957,336
[45] Date of Patent: Sep. 18, 1990

[54] LASER BEAM SCANNER AND ITS FABRICATING METHOD

[75] Inventors: Shin-ya Hasegawa, Machida; Masayuki Kato, Atsugi; Fumio Yamagishi, Ebina; Hiroyuki Ikeda, Yokohama; Takefumi Inagaki, Kawasaki, all of Japan

[73] Assignee: Fujitsu Limited, Kawasaki, Japan

[21] Appl. No.: 269,412

[22] Filed: Nov. 10, 1988

Related U.S. Application Data

[63] Continuation of Ser. No. 890,619, Jul. 30, 1986, abandoned.

[30] Foreign Application Priority Data

| | | |
|---|---|---|
| Jul. 31, 1985 [JP] | Japan | 60-168830 |
| Jan. 25, 1986 [JP] | Japan | 61-14445 |
| Mar. 20, 1986 [JP] | Japan | 61-60826 |
| Mar. 20, 1986 [JP] | Japan | 61-60833 |
| Mar. 20, 1986 [JP] | Japan | 61-60845 |
| Mar. 20, 1986 [JP] | Japan | 61-60846 |

[51] Int. Cl.$^5$ .................. G02B 5/32; G02B 26/10
[52] U.S. Cl. .................. 350/3.71; 350/3.72; 350/3.83
[58] Field of Search .................. 350/3.71, 3.72, 3.70, 350/3.76, 3.83

[56] References Cited

U.S. PATENT DOCUMENTS

| | | | |
|---|---|---|---|
| 4,364,627 | 12/1982 | Haines | 350/3.76 |
| 4,378,142 | 3/1983 | Ono | 350/3.71 |
| 4,428,643 | 1/1984 | Kay | 350/3.71 |
| 4,429,946 | 2/1984 | Haines | 350/3.76 |

FOREIGN PATENT DOCUMENTS

| | | | |
|---|---|---|---|
| 3421705A | 4/1986 | Fed. Rep. of Germany | 350/3.71 |
| 53-75950 | 5/1978 | Japan | 350/3.71 |
| 54-104849 | 8/1979 | Japan | 350/3.71 |
| 56-47019 | 4/1981 | Japan | 350/3.71 |
| 57-192920 | 11/1982 | Japan | 350/3.71 |
| 59-201017 | 11/1984 | Japan | 350/3.71 |

OTHER PUBLICATIONS

Dickson, "Aberrant Holographic Focusing Element for Post-Objective Holographic Deflector," IBM Technical Disclosure Bulletin, vol. 26, No. 12, May 1984, 6687.
Dickson, "Correction of Astigmatism for Off-Axis Reconstruction Beam Holographic Deflector," IBM Technical Disclosure Bulletin, vol. 23, No. 9, Feb. 1981, 4255.
Sincerbox, "Chromatic Correction for a Laser Diode/Holographic Deflector," IBM Technical Disclosure Bulletin, vol. 27, No. 5, Oct. 1984, 2892.
"Dual-Purpose Holographic Optical Element for a Scanner," IBM Technical Disclosure Bulletin, vol. 29, No. 7, Dec. 1986, 2892.

Primary Examiner—Bruce Y. Arnold
Assistant Examiner—Martin Lerner
Attorney, Agent, or Firm—Staas & Halsey

[57] ABSTRACT

A high precision laser beam scanner is provided which is able to shape a beam generated by a laser, suppress the influence of jitter of a scanning beam due to mode hopping of a semiconductor laser, and reduce aberration of the scanning beam. A beam source generates a semiconductor laser beam, which is diffracted by a rotary hologram, forming a scanning beam on a surface to be scanned. An aberration correcting stationary hologram is disposed between the beam source and the rotary hologram. The stationary hologram is constructed with an object wave and a reference wave, which interfere on a stationary hologram substrate subject so that an aberration of the scanning beam on the surface to be scanned shall be corrected. The object wave is a spherical wave which has an aberration, a wave length shorter than that of the semiconductor laser beam, and an incident angle which is not vertical but is inclined with respect to the stationary hologram substrate. A method for fabricating the laser beam scanner is also provided.

29 Claims, 38 Drawing Sheets

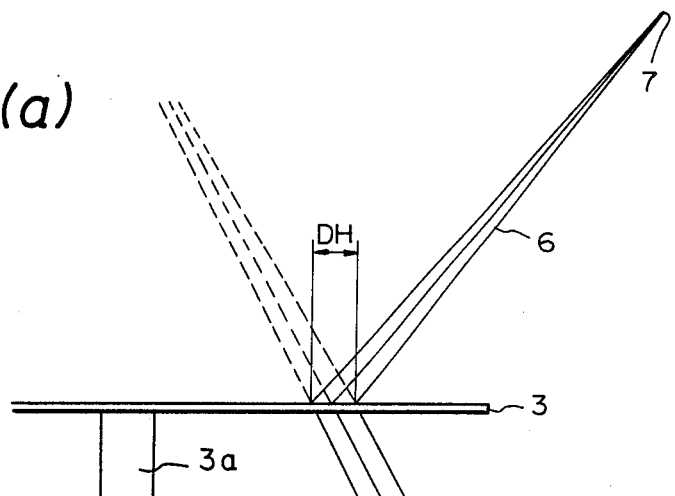
Fig. I(a)
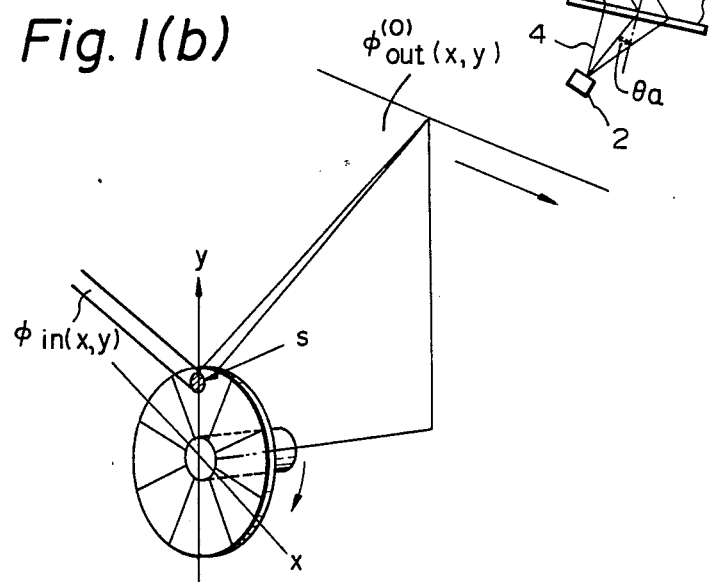
Fig. I(b)

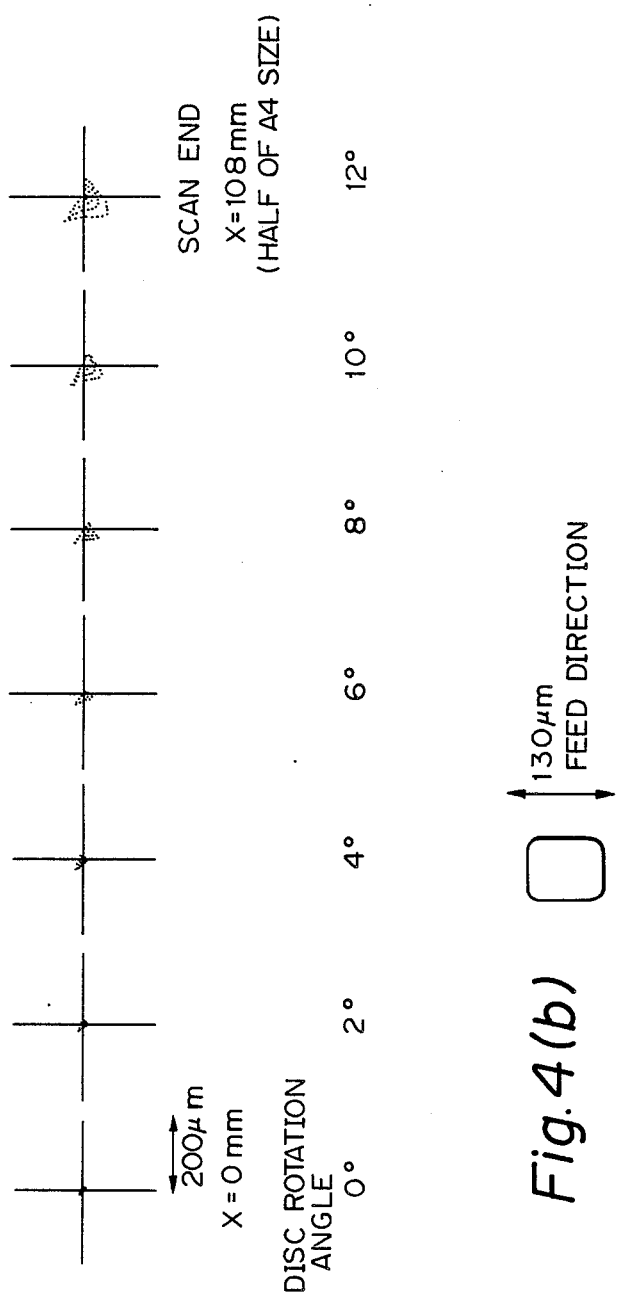

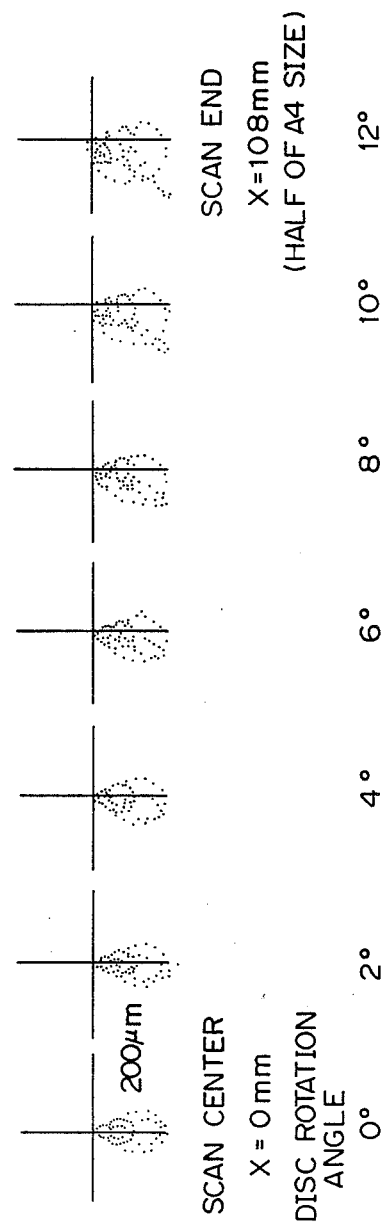

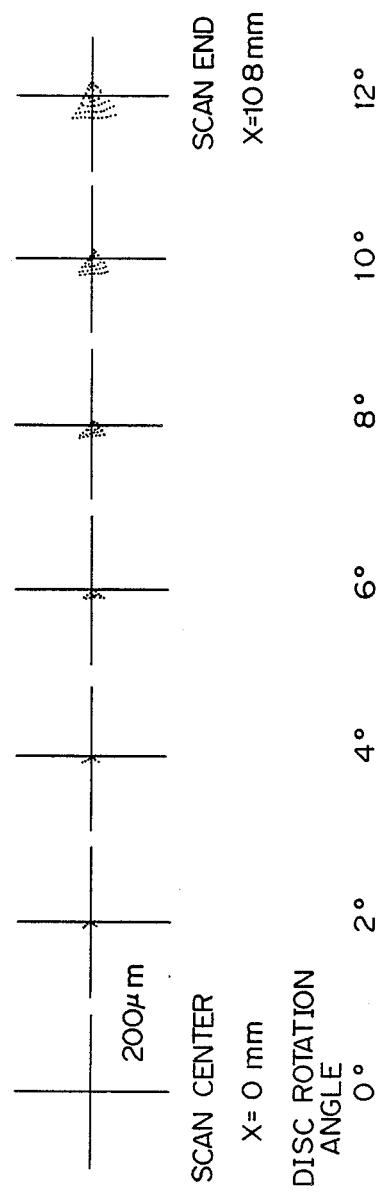

(a) SCAN CENTER X = 0 mm  (b)  (c) SCAN END X = 126 mm (a) SCAN CENTER X = 0 mm  (b)  (c) SCAN END X = 126 mm

Fig. 24
(a)
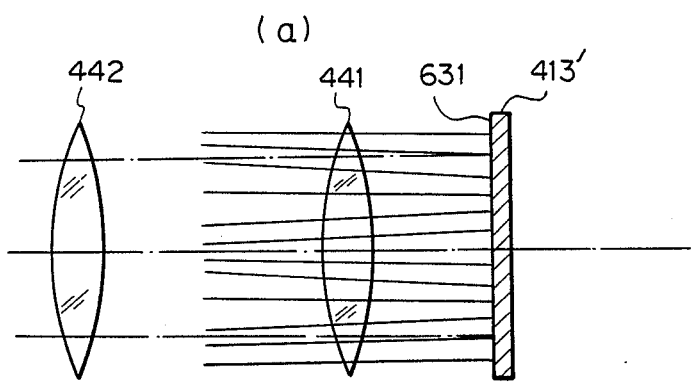
(b)
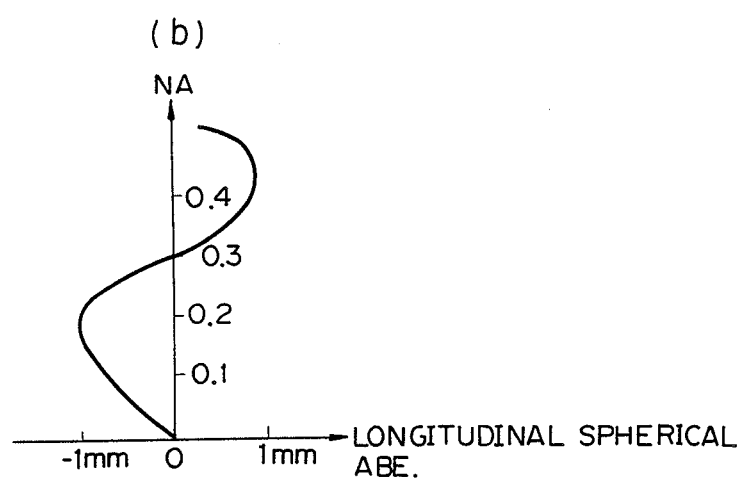

Fig. 29
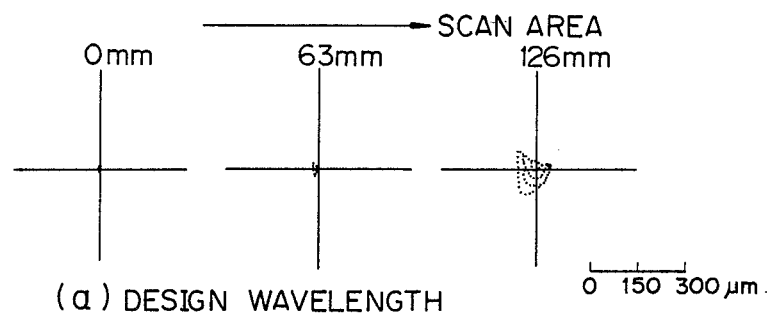
(a) DESIGN WAVELENGTH
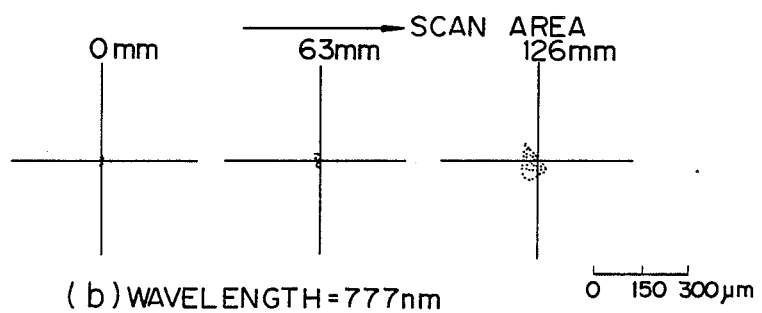
(b) WAVELENGTH = 777nm
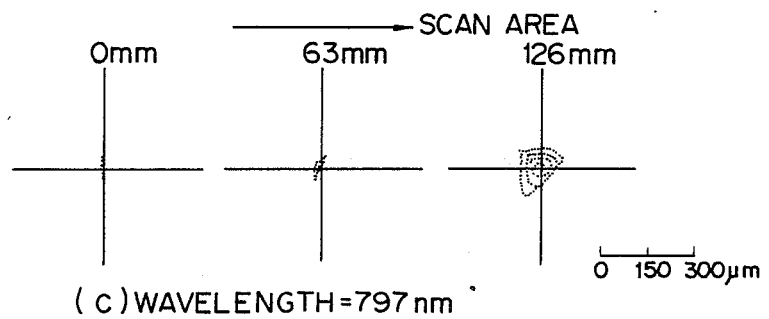
(c) WAVELENGTH = 797nm DESIGN WAVELENGTH
787 nm

Fig. 37
(a)
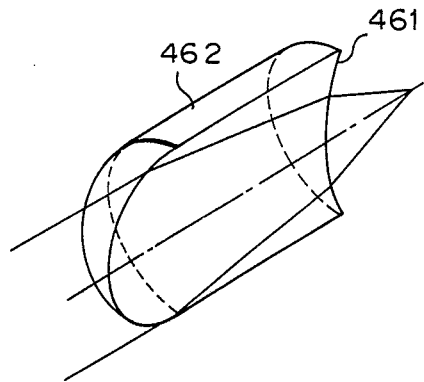
(b)
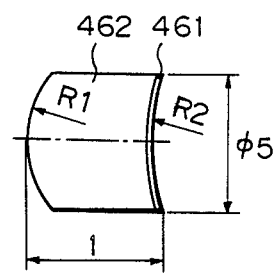
Fig. 38
(a)
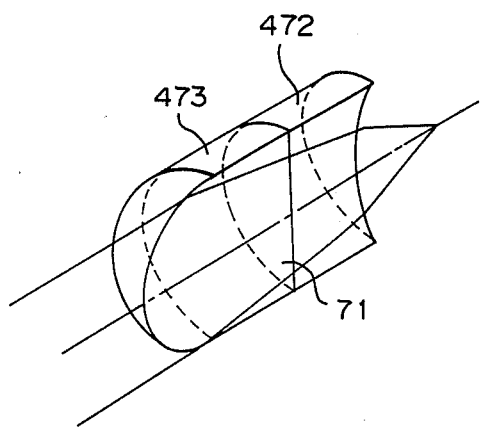
(b)
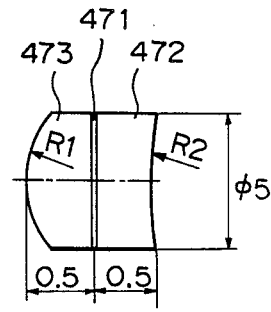

LASER BEAM SCANNER AND ITS FABRICATING METHOD

This is a continuation of co-pending application Ser. No. 890,649 filed on July 30, 1986, now abandoned.

BACKGROUND OF THE INVENTION

1. Field of the Invention

The present invention relates to a high-precision laser beam straight line scanner and its fabricating method. The scanner can perform the shaping of a beam generated by a diode laser, suppress the influence of a the jitter of a scanning beam due to the mode hopping of the semiconductor laser, and reduce the aberration of scanning beam.

Further, the present invention relates to a laser beam scanner having an aberration correcting holographic lens for generating an optimum incident wave, and to a method for fabricating the holographic lens.

Further, the present invention relates to a method for fabricating a hologram, in which a required astigmatism can be obtained in considering a difference between a reconstruction wavelength and a construction wavelength.

Further, the present invention relates to a method for fabricating a hologram which is used for a hybrid holographic lens. The hybrid holographic lens has a constitution to bring an optical spherical lens close to a flat plate hologram, or to fabricate a hologram on the optical spherical lens as well as having a feature that a wide image circle is realized. The present invention relates particularly to a method for fabricating a hologram in which an object wave is made incident easily.

Further, the present invention relates to a laser beam scanner which can suppress the deterioration of a scanning beam diameter due to the influence of variation of an oscillation wavelength of a semiconductor laser depending on its production lot.

2. Description of the Related Art

In the precision straight line scanning of a laser beam for a laser printer, attention is given to a laser beam scanner adopting a holographic scanner which is compact, light-weight, inexpensive, simple in structure, and easy to form, instead of a polygon mirror adopting a rotary polygon mirror, which is complex and expensive.

Prior art laser beam scanners are disclosed in Japanese Patent Publication (Kokai) Nos. 57-2018, 58-172617, 56-70517, 57-181523, etc.

However, these prior art laser beam scanners have problems such as an aberration of a scanning beam due to a difference in wavelengths to be used for constructing a hologram and for reconstructing the hologram, and the generation of an aberration due to the variation of wavelengths and the mode hopping of a laser beam so that the highly reliable laser beam scanning will not be realized.

SUMMARY OF THE INVENTION

It is an object of the present invention to provide a laser beam scanner comprising a beam source for generating a semiconductor laser beam; a rotary hologram for diffracting the semiconductor laser beam to form a scanning beam on a surface to be scanned; and an aberration correcting stationary hologram disposed between the beam source and the rotary hologram, wherein the stationary hologram is fabricated with an object wave and a reference wave being interfered on a stationary hologram substrate subject that an aberration of the scanning beam on the surface to be scanned shall be corrected, a wavelength shorter than that of the semiconductor laser beam.

BRIEF DESCRIPTION OF THE DRAWINGS

These and other objects and features of the present invention will become apparent from the following description with reference to the accompanying drawings, in which:

FIG. 1(a) is a side view showing the constitution of an laser beam scanner;

FIG. 1(b) is a view showing the constitution of a holographic scanner and explaining the relationship between the phase of an incident wave and the phase of a diffracted wave;

FIG. 4(a) is a view showing an aberration pattern of a scanning diffracted wave generated by the laser beam scanner shown in FIG. 2;

FIG. 4(b) is a view showing a beam diameter on a surface to be scanned;

FIG. 5 is a view showing an aberration pattern of a scanning diffracted wave in which a convergent lens is used;

FIG. 6 is a view showing an ideal aberration pattern of a scanning diffracted wave to obtain the beam diameter shown in FIG. 4(b);

FIGS. 24(a) and (b) are views explaining an aberration by a hologram at a construction wavelength;

FIGS. 29(a), (b), and (c) are spot diagrams showing beam diameters of the embodiment shown in FIG. 28;

FIGS. 37(a) and (b) are views showing the constitution of a prior art example of a hybrid holographic lens;

FIGS. 38(a) and (b) are views showing another prior art example of the hybrid holographic lens;

DESCRIPTION OF THE PREFERRED EMBODIMENTS

Before describing the preferred embodiments of the present invention, an explanation will be given of the prior art to understand the present invention well.

Figure 32A:
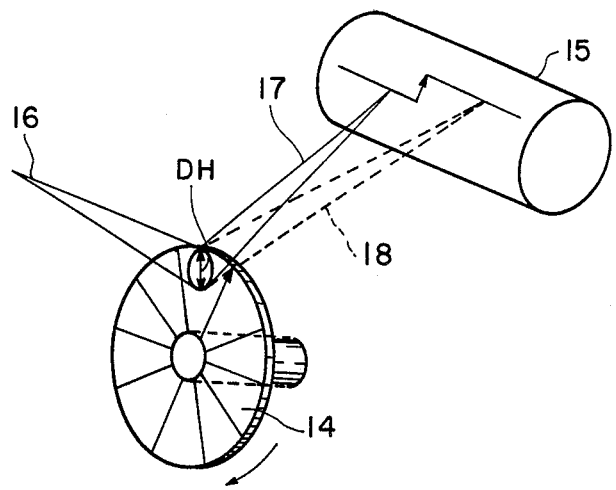
FIG. 32(a) is a perspective view explaining the principle of a prior art laser beam scanner adopting a holographic lens.
Figure 32B:
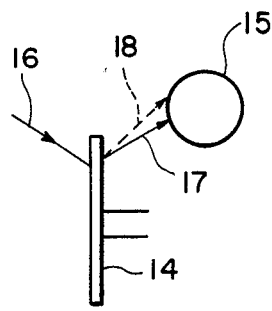
FIG. 32(b) is a side view of the prior art beam scanner.

FIG. 32 is a view showing the principle of a prior art laser beam scanning apparatus adopting a hologram. In this prior art example, a method disclosed in the Japanese Patent Application No. 57-2018 by this inventor et al., is used. FIG. 32(a) is a perspective view, in which a holographic scanner 14 (a scanning holographic lens) is a disk provided with a plurality of interferometric zone plates (IZPs) each of which is formed by generating a coherent plane wave having a short wavelength and a spherical wave, and by causing the waves to interfere with each other on a photosensitive plate. When a semiconductor laser beam 16, which is a divergent wave, is irradiated as a reconstruction wave onto the holographic scanner 14, its diffracted beam 17 forms an image on a photoconductor drum 15. According to the rotation of the holographic scanner 14, a predetermined area on the drum 15 is scanned in straight line for the number of IZPs per revolution of the holographic scanner 14. Namely, the holographic scanner 14 has a function of scanner as well as a function of image formation lens, i.e., a function of beam focusing.

To increase the resolution on the photoconductor drum 15, a diameter of the image formed by the diffracted beam 17 on the photoconductor drum 15 shall be made as small as possible Hence, a diameter DH of an irradiated beam on the holographic scanner 14 shall be made larger according to the diffraction theory.

If the beam diameter DH is enlarged, however, an astigmatism and a coma aberration are generated to cause a problem that an image formation point on the photoconductor drum 15 is not fixed at one point, contrary to the requirement to reduce the diameter of the image formation beam on the photoconductor drum 15 by enlarging the beam diameter DH.

Apart from the above problem, the semiconductor laser has become an important laser beam source for a holographic scanner because it is compact, light weight, inexpensive and allows the direct modulation. In this case, a single mode laser is required, because, if it is not, a longitudinal mode of the semiconductor laser does not make a scanning beam to be a point. An index waveguided type of semiconductor laser which is presently available satisfies the above conditions. Even if it is a single mode laser, a phenomenon called mode hopping, in which an oscillation wavelength of the laser is shifted by 0.3 nm to several nanometers, is caused in the DC biasing by the changes of an ambient temperature, a conducting electric current, and an applied pulse. If mode hopping occurs, the diffracted beam 17 diffracted by the holographic scanner 14 is shifted as indicated by a dash line 18 shown in FIGS. 32(a) and 32(b) (a side view of FIG. 32(a)) so that a scanned image formation position on the photoconductor drum 15 is shifted by 100 to 300 μm. This may be a serious problem in using the laser as a precision straight line scanner for a laser printer because the quality of a printed character is deteriorated.

Figure 33A:
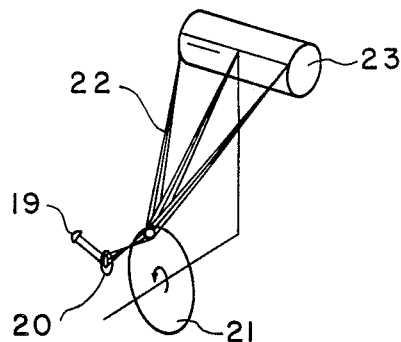
FIG. 33(a) is a perspective view showing the constitution of a prior art example for solving an aberration problem.
Figure 33B:
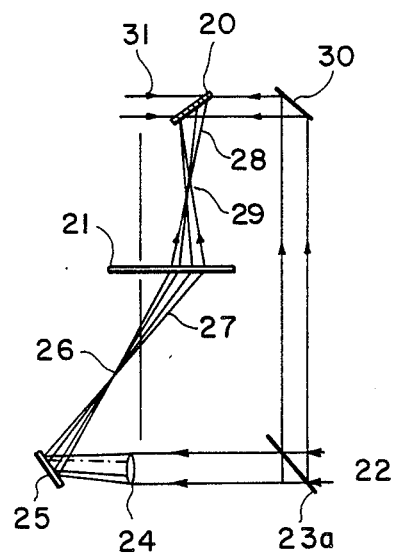
FIG. 33(b) is a view explaining a fabricating method of the aberration correcting hologram lens shown in FIG. 33(a)

To solve the above problems of the aberration and the mode hopping of the scanning beam, several prior art examples have been proposed FIGS. 33 show a technique disclosed in the Japanese Patent Application No. 58-172617 by the present inventor et al., to solve the problem of the aberration of scanning beam. As shown in FIG. 33(a) which is a perspective view, a plane wave irradiated from a laser beam source 19 and converted by an optical system is diffracted as a convergent spherical wave by an aberration correcting holographic lens 20, intersected, and irradiated on a holographic scanner 21 (a scanning holographic lens) so that a diffracted wave 22 will scan and form an image on a photoconductor drum 23. The principle of the technique is that, if an aberration which will cancel an astigmatism and a coma aberration to be generated at the scanning center on the photoconductor drum 23 is generated by the aberration correcting holographic lens 20, the astigmatism and coma aberration may be cancelled so that an image is formed at one point at the scanning center on the photoconductor drum 23. FIG. 33(b) is a view showing a method for fabricating the aberration correcting holographic lens 20 to generate the aberration. A plane wave 22 from a laser beam source forms an image at an image formation point 26 (corresponding to at the scanning center on the photoconductor drum 23) through a half mirror 23a, an image formation lens 24, and a mirror 25. An image formation wave 27 is irradiated as a divergent spherical wave onto the holographic scanner 21 in an opposite direction, and its diffracted wave is intersected at the reference mark 29 and irradiated as an object wave 28 onto the holographic lens 20. The holographic lens 20 is formed by the object wave 28 which cancels the aberration generated by the holographic scanner 21 so that a plane wave which is irradiated as a regenerating wave in a direction of the reference mark 31 onto the holographic lens 20 will proceed the path in an opposite direction to the one for fabricating the holographic lens to form an image at the image formation point 26 with a diffracted wave having no aberration. According to the above technique, the problems of the aberration at the scanning center are solved.

Figure 34A:
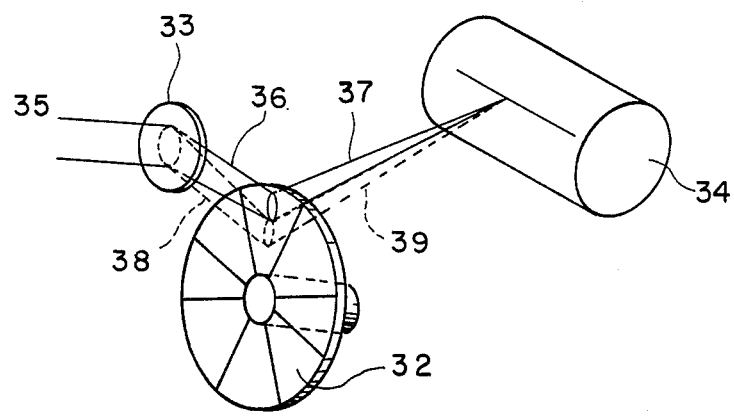
FIG. 34(a) is a perspective view explaining the principle of a prior art example for solving a mode hopping problem.

FIG. 34(a) is a perspective view showing the general principle of a prior art example for solving the influence of mode hopping Before this example, there has been proposed a method for compensating an aberration which is caused because a diffracted beam from a hologram is diverged when the spectrum width of a hologram regenerating beam source is wide According to the method, another hologram which performs the diffraction in an opposite direction to the diffraction by the previous hologram is disposed after the previous hologram to compensate the aberration.

((1) C. B. Burckhardt, Bell Syst. Tech. J. 45, 1841 (1966); (2) D. J. DeBitetto, Appl. Phys. Lett. 9, 417 (1966); (3) "Optical Holography" Academic press, N.Y. 1971, 1971, p. 502)

Figure 34B:
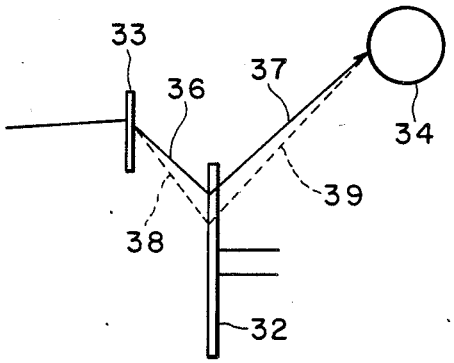
FIG. 34(b) is a side view of the prior art structure of FIG. 34(a)

The example shown in FIG. 34(a) is based on the same idea. The example shown in FIG. 34(a) is characterized in that a holographic lens 33 is disposed before a holographic scanner 32, the characteristic of holographic lens 33 being that it causes the diffraction in an opposite direction to the holographic scanner 32 Due to this arrangement, a semiconductor laser beam 35 generally becomes a diffracted wave 36 by the holographic lens 33, and is diffracted by the holographic scanner 32 to become a convergent wave 37 to form an image on a photoconductor drum 34. If the mode hopping is generated in the semiconductor laser, the beam at the holographic lens 33 is vertically shifted downward as indicated by a dash line 38 shown in FIG. 34(b), which is a side view. In the holographic scanner 32, however, the beam is vertically shifted upward as indicated by a dash line 39 on the contrary to the previous case so that a scanning point on the photoconductor drum 34 will not be shifted Thus, the influence of the mode hopping will be eliminated.

Figure 35:
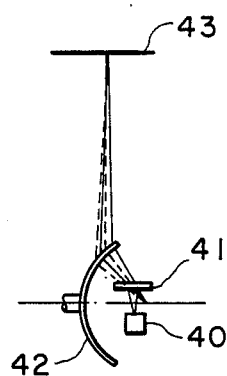
FIG. 35 is a side view showing the constitution of a concrete prior art example for solving the mode hopping problem.

FIG. 35 is a view showing a technique disclosed in the Japanese Patent Application No. 56-70517 as a prior art example utilizing the above technique In this prior art example which is quite the same as the example shown in FIG. 34, a semiconductor laser beam 40 is once diffracted by a holographic lens 41, and diffracted and scanned by a holographic scanner 42 to form an image on a screen 43.

Figure 36A:
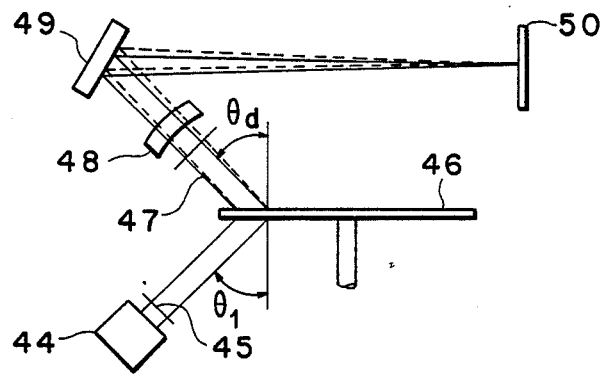
FIG. 36(a) is a side view showing the basic constitution of another concrete prior art example for solving the mode hopping problem.
Figure 36B:
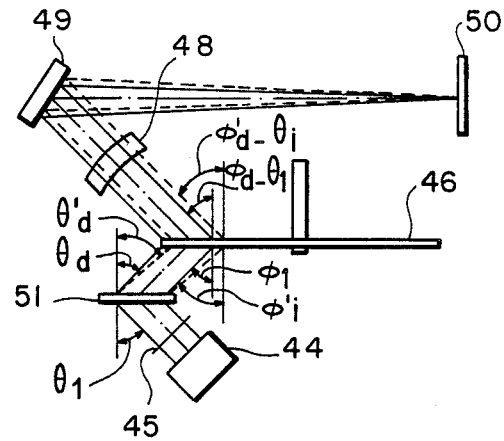
FIG. 36(b) is a side view showing the constitution of another concrete prior art example for solving the mode hopping problem.
Figure 39:
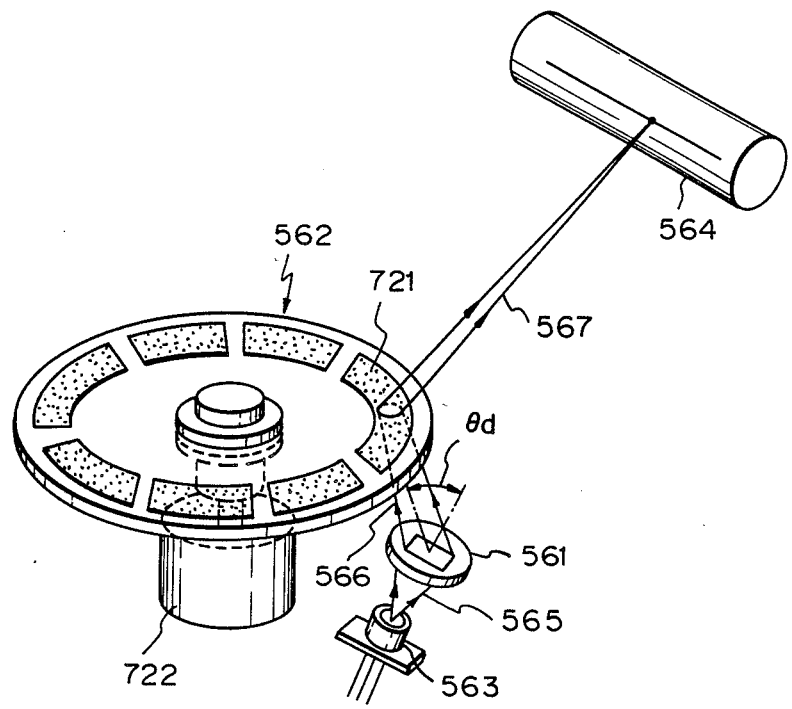
FIG. 39 is a schematic view showing a laser beam scanner on which the present invention is based.

FIG. 36(b) is a view showing a technique disclosed in the Japanese Patent Application No. 57-181523 as another prior art example utilizing the technique shown in FIG. 34. As shown in FIG. 36(a), a semiconductor laser beam is converted into a plane wave 45 by an optical system 44, and diffracted and scanned by a holographic scanner 46 to form a diffracted plane wave 47 by which an image is formed on a screen 50 through an image formation lens 48 and a mirror 49. Comparing to the example shown in FIG. 36(a), the example shown in FIG. 36(b) discloses the insertion of a correcting holographic lens 51, and the concrete arrangement of the lens 51, etc.

Among the above prior art examples, the example shown in FIGS. 33(a) and (b) for solving the aberration discloses a method for fabricating the aberration correcting holographic lens as shown in FIG. 36(b). If it is stipulated to use a semiconductor laser beam in this prior art example, the same semiconductor laser beam shall be used as a wave for fabricating the aberration correcting holographic lens. However, there is generally no high efficient photosensitive material which can record as a hologram a long wavelength such as the wavelength of semiconductor laser beam, and the prior art example does not disclose a technique to solve the problem. Since an incident beam to the aberration correcting holographic lens is a plane wave, a beam irradiated from the laser shall be changed to the plane wave through a collimator comprising a plurality of lenses.

On the other hand, the prior art example shown in FIGS. 35(a) and (b) discloses a basic idea for eliminating the influence of the mode hopping, but has a drawback in that it does not disclose a means for applying the idea for a practical laser beam scanner.

Although the prior art example shown in FIGS. 36(a) and (b) discloses a concrete application, it is only for the one using a plane wave as the reconstruction wave Since the holographic scanner is of fixed spatial frequency, it does not have an optical power so that the expensive collimator 44 and image forming lens 48 shall be provided.

To realize an laser beam straight line scanner which is inexpensive and highly accurate to eliminate the above problems simultaneously, an object of the present invention is to provide a laser beam scanner comprising a semiconductor laser, an aberration correcting holographic lens, and a scanning holographic lens without using other ancillary optics to simultaneously solve the problems of the astigmatism, coma aberration, and mode hopping of a scanning beam as well as shaping the beam from a semiconductor laser and absorbing the scanning characteristic (straightness of the scan line, etc.) due to the variation of oscillation wavelength of the semiconductor laser caused depending on its production lot. The present invention further provides a concrete forming method of the laser beam scanner.

In order to solve the previously mentioned problems, the present invention provides a laser beam scanner and its fabricating method. The laser beam scanner scans a surface to be scanned by a diffracted wave which is generated by irradiating a wave from a laser into a scanning holographic lens having variable spatial frequency incorporating optical power, and is characterized in that the laser is a semiconductor laser, and an aberration correcting holographic lens being provided to convert a wave front of the irradiated wave to reduce the astigmatism and coma aberration of the scanning diffracted wave on the surface to be scanned.

In the arrangement of the laser beam scanner mentioned above, a divergent spherical wave irradiated from the semiconductor laser is made incident into the aberration correcting holographic lens and converted into a wave front having an aberration which cancels the astigmatism and coma aberration of a scanning beam generated by the scanning holographic lens on the surface to be scanned. The diffracted wave thus converted from the aberration correcting holographic lens is made incident into the scanning holographic lens, and a diffracted wave therefrom is scanned as a convergent spherical wave on the surface to be scanned to form an image. At this time, the astigmatism and coma aberration generated by the scanning holographic lens are corrected by the previously mentioned aberration to reduce the astigmatism and coma aberration on the surface to be scanned. By setting a diffraction angle of the aberration correcting holographic lens to an angle in which the change of scanning points on the surface to be scanned due to the diffracted wave from the scanning holographic lens is reduced with respect to the hopping of the longitudinal mode of the semiconductor laser, and the jitter of scanning beam being reduced.

In the fabricating method of the above laser beam scanner, the aberration correcting hologram is fabricated in such a manner that a beam having a wavelength $\lambda_1$ which is shorter than the wavelength $\lambda_2$ of a semiconductor laser beam which is used as a reconstruction beam is made to be a reference wave by generating a spherical aberration through an auxiliary optical system, and a beam having the same wavelength $\lambda_1$ is made to be an object wave by generating an astigmatism and a coma aberration through an auxiliary optical system to the astigmatism and coma aberration uniformly generated by the scanning holographic lens for the entire scanning width so that the aberration correcting holographic lens can be formed to demonstrate above action with the reconstruction beam of wavelength $\lambda_2$ from the semiconductor laser.

An embodiment of the present invention will be described in detail. Constitution and Operation of Laser Beam Scanner FIG. 1(a) is a side view showing the constitution of a laser beam scanner according to the present invention. A divergent spherical wave 4 irradiated from a semiconductor laser 2 is made incident into an aberration correcting holographic lens 1. A diffracted wave 5 of a beam diameter DH from the holographic lens 1 is made incident into a holographic scanner (scanning holographic lens) 3 which has a disk-like shape and is rotated around a shaft 3a. A diffracted wave 6 which is a convergent spherical wave from the holographic scanner 3 forms an image at an image formation point 7 on a photoconductor drum (not shown) to scan according to the rotation of the holographic scanner 3.

In the above arrangement, the aberration correcting holographic lens 1 is set to a proper diffraction angle which will be described later such that the image formation point 7 is not shifted with respect to the hopping in a longitudinal mode of the semiconductor laser 2. At the same time, the aberration correcting holographic lens 1 is formed to generate a wave front having an aberration which takes in a divergent wave irradiated from the semiconductor laser 2 and then cancels the astigmatism and coma aberration generated by the holographic scanner 3 so that an aberration at the image formation point 7 will be reduced. It will be considered what the incident wave front shall be, to reduce the aberration of a scanning beam on a surface to be scanned.

In FIG. 1(b), supposing a phase transfer function of the scanning holographic lens 3 is $\phi_H(x, y)$, and the phase of an incident wave and the phase of a diffracted wave $\phi_{IN}(x, y)$ and $\phi_{OUT}(x, y)$ respectively, the following is established.

$$\phi_{OUT}(x, y) = \phi_{IN}(x, y) + \phi_H(x, y) \tag{1}$$

According to a holographic scanner disclosed by this inventor in the Japanese Patent Publication (Kokai) No. 60-194419, which will be explained later, a hologram is constructed by using a beam having a wavelength shorter than that of a reconstruction beam. Since the hologram construction condition is not the same as the hologram reconstruction condition, an aberration is generally caused in $\phi_{OUT}(x, y)$ if there is no aberration in $\phi_{IN}(x, y)$. On the other hand, in an embodiment disclosed in the Japanese Patent Application No. 59-659, a phase transfer function $\phi_H(x, y)$ is designed such that the aberration is reduced as much as possible and is obtained the flat tied focusing Supposing the phase of a required diffracted wave is $\phi_{OUT}(x, y)$, it will be understood from the equation (1) that an incident wave which satisfies the following equation shall be made incident to obtain a beam diameter having smaller aberration.

$$\begin{array}{c}\phi_{IN}(x, y)\\ \forall (x, y) \in S\end{array} = \phi_{OUT}^{(0)}(x, y) - \phi_H(x, y) \tag{2}$$

S: reconstruction region

Namely, no aberration, i.e., $\phi_{OUT}(x, y) = \phi_{OUT}(x, y)$ is obtained. The phase of a required diffracted wave is a convergent spherical wave which generates no aberration on the surface to be scanned. Since the reconstruction region is changed according to the rotation of the disk, the region will be limited to a scanning center hereinafter.

In FIG. 1(b), while a beam incident region S on the disk being the scanning center, if an incident wave satisfies the equation (2) for all points in the reconstruction region S, the aberration is completely eliminated at least in the scanning center. Therefore, the aberration correcting holographic lens is designed such that the diffracted wave 5 satisfying the equation (2) is irradiated.

In FIG. 1(a), supposing an incident angle with respect to the aberration correcting holographic lens 1 is $\theta_a$, and an diffracted angle $\theta_b$, the beam diameter of the divergent beam 4 of the semiconductor laser in a direction parallel to a plane of the figure is changed by $(\cos\theta_b/\cos\theta_a)$ times.

A beam of the semiconductor laser is generally an elliptical beam in a far field image. This is because an outgoing mouth is large in a direction parallel to a junction portion and the same is small in a direction vertical to the junction portion so that a diffracted far field image in the direction vertical to the junction portion becomes larger than that in the direction parallel to the junction portion. Generally, a pair of cylindrical lenses and a prism, which are expensive, are used to shape the elliptical beam. According to the method of the present invention, the direction vertical to the semiconductor laser junction portion, i.e., the direction of wider divergent angle of the beam is set to be in parallel with the plane of the figure so that the beam in the direction of wider divergent angle is changed by $(\cos \theta_b / \cos \theta_a)$ times. As a result, the beam shaping can be carried out easily.

Due to the above function, with a simple constitution comprising the semiconductor laser, aberration correcting holographic lens, and holographic scanner (scanning holographic lens), an all-holographic laser beam scanner without any other auxiliary optics and which is inexpensive and highly reliable can be provided. This laser beam scanner has a beam shaping function and can simultaneously solve the astigmatism, coma aberration, and mode hopping.

Concrete Design of Laser Beam Apparatus

Figure 2:
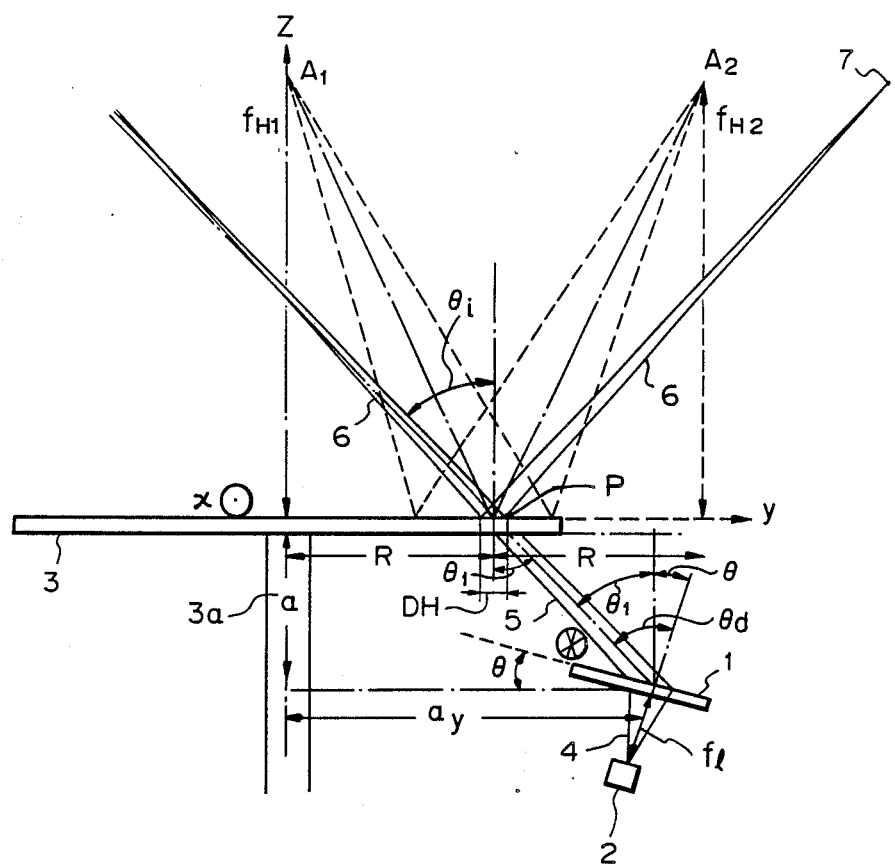
FIG. 2 is a side view showing a concrete design of the laser beam scanner.

FIG. 2 is a view showing a concrete design example of the laser beam apparatus shown in FIG. 1(a) for preventing the influence of mode hopping. As design parameters of the straight line scanning holographic scanner 3, distances from the scanner 3 to two divergent spherical wave sources $A_1$ and $A_2$ at the time of formation are set to $f_{H1}=f_{H2}=125.7$ mm respectively; a radius from a center shaft $3a$ to a hologram incident point P being $R=40$ mm; distances on a y-coordinate from the hologram incident point P to the beam sources $A_1$ and $A_2$ being $R=40$ mm respectively; and a hologram incident angle being $\theta_1=47.25°$. In the design, it is supposed that an He-Cd laser beam of 325 nm in wavelength for constructing the hologram, and a semiconductor laser beam of 8787 nm in wavelength for reconstructing the hologram are used. In this case, a diffraction angle at the scanning center will be 47.25°. The above laser beam scanning method is based on the method disclosed in the Japanese Patent Application No. 59-659 by this inventor.

The Japanese Patent Publication (Kokai) No. 60-194419 is an improvement of the Japanese Patent Application No. 57-2018, which has drawbacks in that the variation of a scanning position is large due to the centration error and wobble of the disk, and the diffraction efficiency is small since the Bragg angle condition is not satisfied.

An oscillation wavelength of the semiconductor laser varies by about ±10 nm according to the production lot. An average of the wavelength is generally 787 nm which is set as a reconstruction wavelength. The deterioration of scanning characteristic such as a straightness of the scanning line due to the variation of ±10 nm in the oscillation wavelength of the semiconductor laser can be prevented by the present invention. This will be described later.

An explanation will be made how to set a diffraction angle of the aberration correcting holographic lens. Since the incident angle of the scanning holographic lens is $\theta_1=47.25°$, an incident angle of the diffracted wave 5 is also $\theta_1=47.25°$. From FIG. 2, $\tan \theta_1 = (a_y - R)/a$. Since $R=40$ mm, there are set $a = 10$ mm and $a_y = 50.8$ mm. In the laser beam apparatus set as mentioned in the above, a wavelength of the semiconductor laser is supposed to 787 nm, the scanning point is returned to the image formation point 7 even after the hopping of 1 mode$=0.3$ nm, if an angle of dislocation $\Delta\theta_d$ of an outgoing angle of the diffracted wave 5 from the aberration correcting holographic lens 1 is 0.04534° which is found according to the numerical calculation. Supposing a central diffraction angle of the aberration correcting holographic lens 1 is $\theta_d$; the amount of dislocation of wavelength due to the mode hopping $\Delta\lambda_2$; and a central spatial frequency of the holographic lens 1 "f", the following will be established.

$$f = \frac{\cos \theta_d \cdot \Delta\theta_d}{\Delta\lambda_2} \quad (3)$$

Supposing a central oscillation wavelength of the semiconductor laser is $\lambda_2$, it will be expressed as follows:

$$f = \frac{\sin \theta_d}{\lambda_2} \quad (4)$$

From the equations (3) and (4), the following will be established:

$$\tan \theta_d = \frac{\lambda_2}{\Delta\lambda_2} \cdot \Delta\theta_d \quad (5)$$

Since $\lambda_2=787$ nm$=7.87\times 10^{-4}$ mm, $\Delta\lambda_2=0.3$ nm$=0.3\times 10^{-6}$ mm, and $\Delta\theta_d=0.04534°=0.04534\times(\pi/180)$rad, these values are substituted for the equation (5) to obtain $\theta_d=64.28°$. Namely, if the central diffraction angle of the holographic lens 1 is set to 64.28°, the influence of mode hopping will be suppressed to be minimum. Accordingly, it will be understood in FIG. 2 that the aberration correcting halographic lens 1 shall be inclined by $\theta = \theta_d - \theta_1 = 64.28 - 47.25 = 17.03°$ with respect to the holographic scanner 3. Although the above is found based on the 1-mode hopping, the above setting value is effective for several modes hopping.

According to the setting mentioned in the above, a laser beam scanner which suppresses the influence of the mode hopping can be provided.

Method for Fabricating Aberration Correcting Holographic Lens

A method for fabricating the aberration correcting holographic lens 1 in the laser beam scanner will be described with reference to FIG. 3(a). Firstly, a method for correcting an aberration of the scanning holographic lens will be described. A difference between FIG. 2 and FIG. 3(a) resides in that a beam 8 made incident into the aberration correcting holographic lens 1 is a vertical plane wave of a semiconductor laser beam. Other parameters of the previous design values will be used again here. If a semiconductor laser beam which is a reconstruction wave is used to fabricate the aberration correcting holographic lens 1 shown in FIG. 3(a), there is no photosensitive material which can record the semiconductor laser beam as a hologram with high efficiency. Therefore, it is considered to fabricate the holographic lens 1 with a laser beam having a wavelength shorter than that of the semiconductor laser beam. In this case, it is supposed that the wavelength of semiconductor laser beam (reconstruction wave) is $\lambda_2$, and the wavelength of the construction wave $\lambda_1$. Namely, $\lambda_2 > \lambda_1$.

Figure 3A:
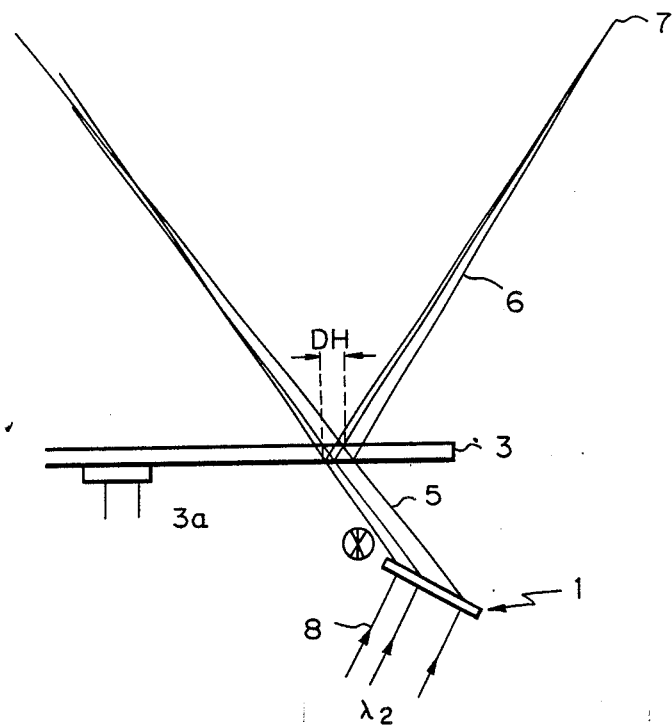
FIGS. 3(a), (b), and (c) are views explaining a method for fabricating an aberration correcting holographic lens.

In FIG. 3(a), if an incident beam diameter DH of an incident wave 5 on a holographic scanner 3 is enlarged to make small an image forming beam diameter at an image formation point 7, the astigmatism and coma aberration will be caused at the image formation point 7 due to an aberration caused by the holographic scanner. Therefore, the fabricating wave of wavelength $\lambda_1$ of the holographic lens 1 is given with an aberration which will correct the astigmatism and coma aberration. Namely, a wave front which can generate the following phase when being reconstructed with the beam of wavelength $\lambda_2$, shall be constructed with the wavelength $\lambda_1$.

$$\phi_{IN}(x, y) = \phi^{(O)}_{OUT}(x, y) - \phi_H(x, y)$$

Figure 3B:
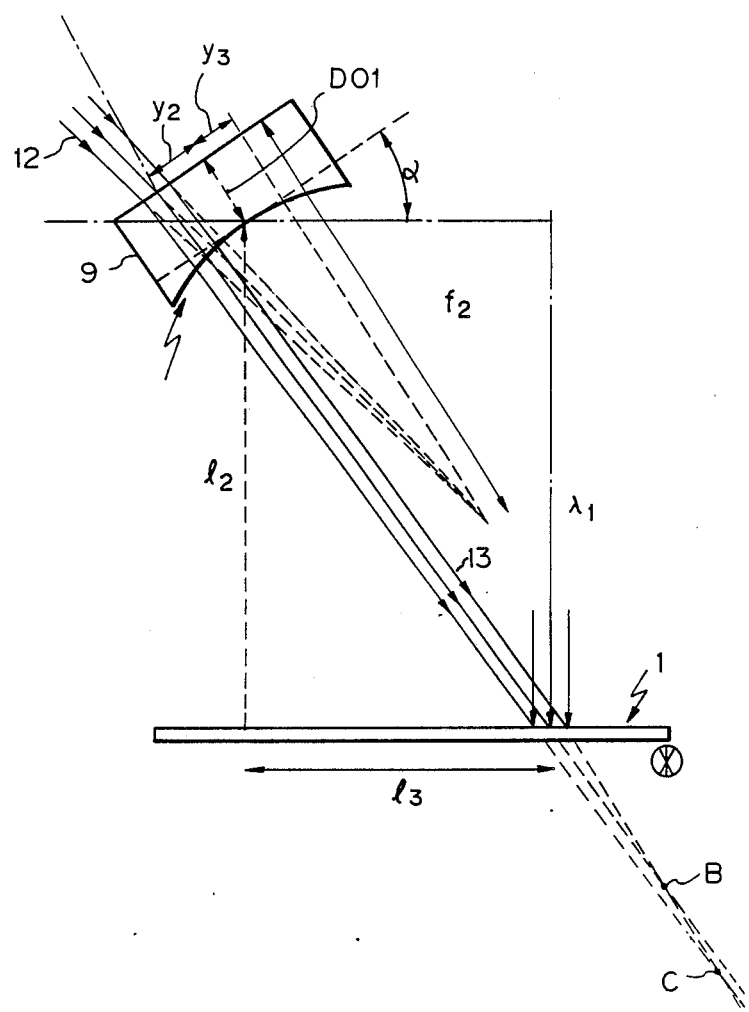

According to a calculation, it has been found that an aberration at the wavelength $\lambda_1$ for the above shall be a so-called outward coma aberration. The outward coma aberration can be generated by using a lens. If a convergent spherical wave 12 shown in FIG. 3(b) shifted by a distance $y_2$ from an optical axis is made incident into a concave lens 9 which is inclined by a predetermined angle $\alpha$, its outgoing wave becomes an outward convergent coma aberration wave 13. This wave is made to be an object wave for forming the holographic lens 1. The coma aberration wave 13 is set to have the same relation as the diffracted wave 5 shown in FIG. 3(a) when the semiconductor laser is used. The holographic lens is set in a direction indicated by the reference mark (*). In this case, the fabricating wavelength is $\lambda_1$ (488 nm, Ar laser), and the parameters of concave lens 9 are; lens thickness DO1=20.99 mm, refractive index 1.552 (wavelength 488 nm), curvature $R_2 = 65$ mm, incident position $y_2 = 16.71$ mm, distance from an incident focus to an optical axis $y_3 = 28.06$ mm, incident focal length $f = 112.3$ mm, inclination angle $\alpha = 17.7°$, distance from the concave lens 9 to a hologram photosensitive surface $l_2 = 140$ mm, and a horizontal distance from the center of the hologram photosensitive surface to the concave lens 9 $l_3 = 81$ mm. As a result, the optimum outward coma aberration wave 13 has been obtained. As shown in FIG. 3(b), a reference wave is a vertical plane wave.

By using the holographic lens 1 formed as mentioned in the above, the laser beam scanner shown in FIG. 3(a) is constituted. Naturally, a central diffraction angle at the time when a vertical plane wave from the semiconductor laser ($l_2$) is made incident into the holographic lens becomes to be 64.28°. The parameters of the constitution shown in FIG. 3(a) are the same as those of the constitution shown in FIG. 2. The only difference is that a beam made incident into the aberration correcting holographic lens is a vertical plane wave ($\lambda_2$) of the semiconductor laser.

Ray-traced spot diagram of the scanning diffracted wave 6 from the scanning holographic scanner shown in FIG. 3(a) are shown in FIG. 4(a). In this case, an object to be scanned is of the A4 size (216 mm) in considering that the scanner may be used for a laser printer. FIG. 4(b) is a view showing a beam diameter which is generally required. To obtain diffraction limited spot size, the scanning hologram incident beam diameter DH is fixed, and ray-traced spot diagram shown in FIG. 4(a) have been obtained An image formation distance is 337 mm, and the incident diameter DH 3.8 mm. From the figure, it will be understood that the present invention can perform the almost complete scanning with no aberration. FIG. 5 is a view showing a beam diameter which is obtained with a no-aberration incident wave to the holographic scanner, instead of the holographic lens 1. As apparent from the figure, the present invention can perform the significant aberration correction. FIG. 6 is a view showing an ideal aberration correction calculated by using the equation of $\phi_{IN}(x, y) = \phi_{out}(x, y) - \phi_H(x, y)$ to obtain the beam diameter shown in FIG. 4(b). From this, it will be understood that the aberration correction of the present invention is close to the ideal one.

As described in the above, a method for fabricating the aberration correction wave front of the scanning holographic lens has been realized. However, a beam made incident into the aberration correction holographic lens is the vertical plane wave ($\lambda_2$) of the semiconductor laser so that an optical system which changes a divergent beam of the semiconductor laser into the vertical plane wave is required.

Therefore, a method for taking in the divergent beam of the semiconductor laser will be described.

In order to achieve this, a method for converting the divergent beam of the semiconductor laser into the vertical plane wave is required.

Figure 7A:
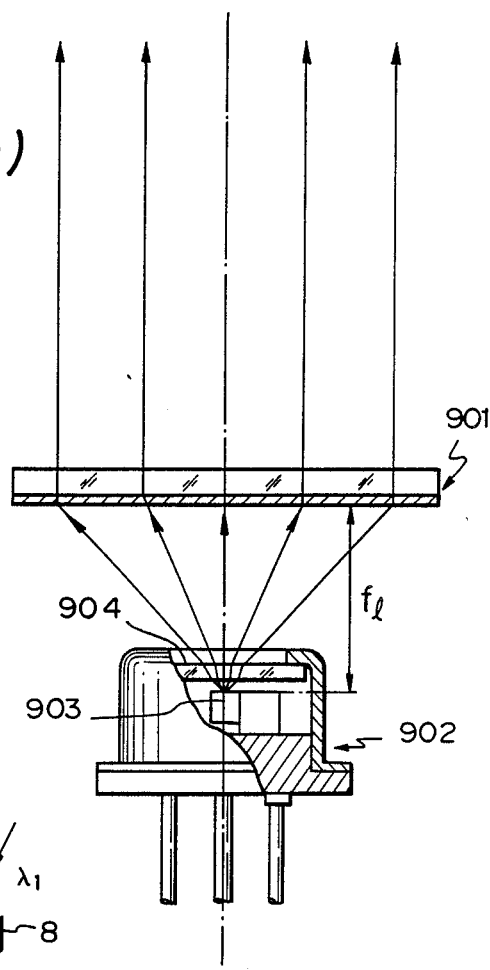
FIG. 7 is a view showing a method for fabricating a holographic lens which converts a divergent wave from a semiconductor laser into a plane wave.
FIG. 7(b) is a view showing a method for fabricating a holographic lens.

FIG. 7(a) is a view showing a method for constructing a holographic lens which can change a divergent wave into a vertical plane wave. The divergent wave is irradiated from a semiconductor laser of 787 nm in oscillation wavelength, and passed through a glass cap (having 0.3 mm in thickness and 1.5 in refractive index as general values) to have an aberration. Numerals 901, 902 and 903 designate a hologram, a laser diode and a laser diode chip, respectively. To fabricate the holographic lens with a wavelength $\lambda_1$ which is shorter than a reconstructing wavelength, a so-called positive spherical aberration wave is required. Since a gap between the hologram and the aberration generating optical system is generally narrowed, a noise due to a multiple interference is caused so that the fabricating wave cannot be made incident easily. Therefore, a negative spherical aberration wave is once intersected and recorded as the positive spherical aberration.

Figure 7B:
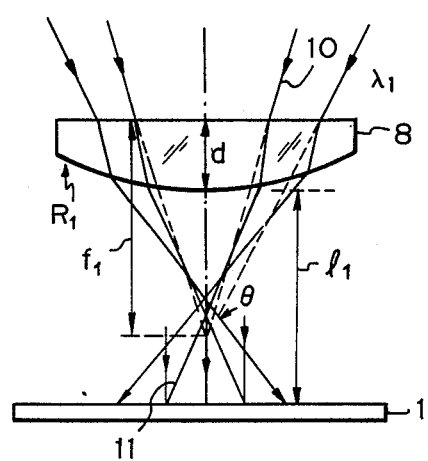

In FIG. 7(b), the hologram fabricating wavelength is of an Ar laser (488 nm). When a convergent spherical wave 10 is made incident into a convex lens 8, an outgoing wave therefrom becomes a negative convergent spherical aberration wave. If the spherical aberration wave is intersected once at an intersection $\theta$, a positive divergent spherical aberration wave 11 can be obtained. The positive divergent spherical aberration wave is made to be a fabricating wave for fabricating the holographic lens 1. Another fabricating wave is supposed to be a vertical plane wave.

The holographic lens made by the aberration wave is optimized in its parameters which are factors of the aberration wave such that the vertical plane wave shown in FIG. 7(a) is obtained. In FIG. 7(a), if, on the contrary, a vertical plane wave is made incident into the holographic lens and if the convergent beam thereof is converged to a diffraction limited spot size after passing through the glass window of the semiconductor laser, it will be understood that the vertical plane wave can be obtained when an outgoing mouth of the semiconductor laser is positioned at the convergent point. Therefore, to converge up to the diffraction limited spot size in FIG. 7(a), i.e., to minimize the wave front aberration, the parameters of aberration optical system are optimized by using the damping least square method (DLS method). As a result, by setting the parameters of the convex lens 8 as; lens thickness d=7.62 mm, curvature $R_1$=26.289 mm, lens refractive index 1.73903 (488 nm), incident focal length $f_1$=31 mm, a distance from the convex lens 8 to a hologram photosensitive surface $l_1$=32.4 mm, the optimum positive divergent spherical aberration wave 11 has been obtained. As a result, when a semiconductor laser ($\lambda_2$:787 nm) of a vertical plane wave which runs a path opposite to the optical path shown in FIG. 7(a) is made incident into the holographic lens and passed through the glass window, the wave front aberration is less than 0.1$\lambda$ and less than the $\frac{1}{4}$ wavelength law of Rayleigh with NA 0.33 so that it will be the holographic lens near to the diffraction limit. The focal length becomes 10.750 mm. Therefore, the holographic lens formed with these parameters is set to $f_l$=10.750 mm in FIG. 7(a), and the vertical plane wave can be obtained.

Figure 3C:
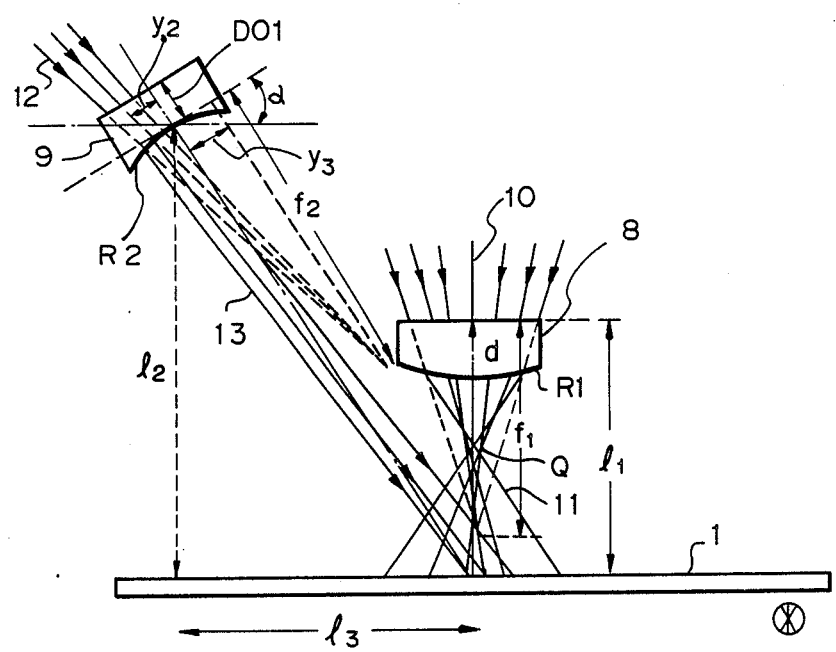

Accordingly, the vertical plane wave which is the reference wave in FIG. 3(b) is replaced with the aberration wave 11 shown in FIG. 7(b) to fabricate the hologram. When the hologram is reconstructed, a divergent beam from the semiconductor laser is firstly converted virtually into a vertical plane wave by which an aberration wave which is an object wave to correct the aberration of the scanning holographic lens can be obtained. Namely, the method for fabricating the holographic lens in which the divergent beam from the semiconductor laser is taken in to generate the aberration correction wave for the scanning holographic lens will be as shown in FIG. 3(c). The parameters are as described before. The holographic lens thus constructed is set as shown in FIG. 2. A distance from an outgoing mouth of the semiconductor laser and the aberration correcting holographic lens is set to $f_l$=10.750 mm. According to this embodiment, by using only the semiconductor laser, aberration correcting holographic lens, and scanning holographic lens, the high precision straight line scanning of almost no aberration is realized. In order to obtain the beam diameter shown in FIG. 4(b), it is required that the NA of the aberration correcting holographic lens is 0.3 so that the aberration correction of NA=0.33 will be sufficient in this example. As seen from this example, the aberration corrections of a reference wave and an objective wave can be considered independently.

Due to the setting shown in FIG. 2, the mode hopping has greatly been reduced to 7 $\mu$m (scanning center) and 8 $\mu$m (scanning end) in a vertical scanning direction, and maximum 45 $\mu$m (scanning end) in a scanning direction with respect to the mode hopping of 0.3 nm. In this case, the beam shaping ratio has become cos (64.28°)/cos (0°)=0.43 times. Even for a laser which has a shift of ±10 nm with respect to the design wavelength 787 nm, the present invention provides a good result for the scanning characteristics such as the straightness of the scanning line. Since the necessary transfer function of the aberration correcting holographic lens has been found, the aberration correcting holographic can directly be written by an electronic beam or formed by a CGH. Although an incident angle of the semiconductor laser shown in FIG. 1 has been set to $\theta_a$=0°, it is naturally not limited t this value. Further, the auxiliary optical system for the aberration correction is not limited to the spherical optical elements but non-spherical optical elements can be adopted.

As described in the above, the present invention provides a laser beam scanner in which a reconstruction wave irradiated from a laser is made incident into a scanning holographic lens having variable spatial frequency because of incorporation of optical power to be scanned by a diffracted wave from the scanning holographic lens, characterized in that the laser is a semiconductor laser, and an aberration correcting holographic lens being provided to change the wave front of the reconstruction wave to reduce the aberration of the diffracted wave on the surface to be scanned.

The embodiment of the present invention is characterized in that the aberration correcting holographic lens is disposed in an optical path of the reconstruction wave between the semiconductor laser and the scanning holographic lens, a diffraction angle of the aberration correcting holographic lens being set such that the change of a scanning point on the surface to be scanned by the diffracted wave from the scanning holographic lens is reduced with respect to the mode hopping of the longitudinal mode wavelength in the semiconductor laser.

Further, the present invention provides a method for fabricating a laser beam scanner, characterized in that an aberration correcting holographic lens is fabricated by using a laser beam having a wavelength $\lambda_1$ which is shorter than a wavelength $\lambda_2$ of a laser beam (reconstruction wave), in which a spherical aberration wave is used as a reference wave, and a coma aberration wave being used as an object wave.

Namely, the present invention realizes a laser beam straight line scanner which is inexpensive and highly accurate only by using a semiconductor laser, an aberration correcting holographic lens, and a scanning holographic lens. The laser beam scanner according to the present invention performs the shaping of a beam of the semiconductor laser, suppresses the influence of jitter of a scanning beam caused by the hopping of a wavelength in the longitudinal mode of the semiconductor laser, absorbs the deterioration of the scanning characteristic (straightness of the scanning line) caused by a variation in the oscillation wavelength of the semiconductor laser, and carries out the aberration correction of the scanning diffracted wave. In addition, the present invention provides a method for fabricating a laser beam scanning apparatus, in which the aberration correcting holographic lens is formed by using a spherical aberration wave as a reference wave, the spherical aberration wave being obtained by making incident a coherent wave having a wavelength shorter than that of the semiconductor laser beam into an auxiliary optical system, and by using a coma aberration wave as an object wave, the coma aberration wave being obtained by making incident the coherent wave into another auxiliary optical system.

According to the present invention, with a constitution of only the semiconductor laser, aberration correcting holographic lens, and scanning holographic lens, the problems related to the astigmatism, coma aberration, and mode hopping are solved simultaneously, and an inexpensive and highly accurate optical beam scanner and its concrete forming method are provided.

With reference to FIGS. 8 to 12, the present invention will be described in more detail.

According to the above technique, it is set such that the aberration of scanning beam is minimized at the scanning center of an image formation surface. In a high quality laser printer, it is required to realize a printing resolution of at least 300 dpi (dots per inch) so that the aberration of scanning beam shall be reduced uniformly not only at the scanning center but also at a scanning end.

An object of this embodiment is to provide a laser beam scanner having the aberration correcting holographic lens for generating the optimum incident wave and a method for practically fabricating the aberration correcting holographic lens.

In order to accomplish the object, the present invention provides a laser beam scanner and its fabricating method, in which the laser beam scanner comprises a scanning holographic lens which has variable spatial frequency and diffracting an incident wave from a semiconductor laser to perform the beam scanning, and an aberration correcting holographic lens which converts the divergent wave irradiated from the semiconductor laser into the incident wave having a wave front which uniformly reduces the aberration at a plurality of convergent points for the entire scanning region of the scanning beam from the scanning holographic lens.

According to the above arrangement, a wave front having a wavelength $\lambda_1$ which is shorter than a wavelength $\lambda_2$ of a reconstruction incident wave is passed through an auxiliary optical system to obtain a coma aberration wave which is substituted for an aberration wave having a wave front corresponding to an optimum incident wave to a scanning holographic lens for the reconstruction and a wave front for correcting an aberration caused by a difference of the wavelength $\lambda_2$ for the reconstruction and the wavelength $\lambda_1$ for the construction. By using the aberration wave as a construction wave for a holographic lens, it is possible to form the holographic lens which generates an optimum incident wave with the reconstruction wavelength $\lambda_2$. Further, this embodiment provides a method for fabricating the aberration correcting holographic lens.

The embodiment of the present invention will now be described in detail.

Description of the Embodiment of the Present Invention

Figure 9:
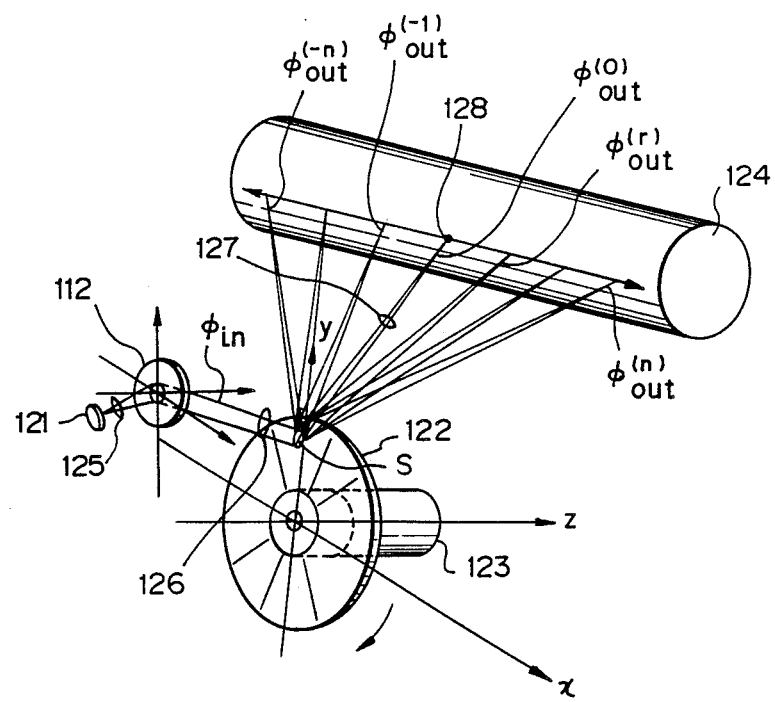
FIG. 9 is a view showing the constitution of the laser beam scanner.

The above embodiment will be described in detail. FIG. 9 is a view showing the constitution of a laser beam scanner using an aberration correcting holographic lens 112. A divergent wave 125 as a reconstruction wave of wavelength $\lambda_2$ from a semiconductor laser 121 is converted into an incident wave 126 which performs the optimum aberration correction of a scanning beam 127 by the aberration correcting holographic lens 112. The incident wave 126 is made incident into a scanning holographic lens 122 which is rotated by a motor 123. The scanning beam 127 obtained from the scanning holographic lens 122 is converged to a convergent point 128 on a photoconductor drum 124 to scan. The aberration of the scanning beam 127 is reduced uniformly for the entire scanning region. A method for deciding the optimum incident wave 126 which uniformly reduces the aberration of scanning beam 127 for the entire scanning region will be described briefly.

Supposing the phases of actual scanning beam 127 at $2n+1$ points to be scanned on the photoconductor drum 124 are $\phi_{OUT}^i(x, y)(i=0, \pm, ... \pm n)$ subject that the scanning holographic lens 122 is arranged on an x-y plane (FIG. 9) and the phases thereof are the functions in x and y directions. Supposing the phase at the point $2n+1$ which is a required no-aberration wave front, $\phi_{OUT}^{(i)}(x, y)$, we set the error function $E^2$ as follows.

$$E^2 = \sum_{i=-n}^{n} \int_s W_i \{\phi_{OUT}^i(x, y) - \phi_{OUT}^{(i)}(x, y)\}^2 ds \quad (6)$$

Wherein, $W_i$ is a weighting function at each point in the scanning region.

Supposing a phase transfer function of the scanning holographic lens 122 at the scanning point i is $\phi_H^{(i)}(x, y)$ and the phase of an incident wave and the phase of a diffracted wave $\phi_{IN}(x, y)$ and $\phi_{OUT}^i(x, y)$, respectively, the following is established.

$$\phi_{OUT}^i(x, y) = \phi_{IN}(x, y) + \phi_H^{(i)}(x, y) \quad (7)$$

Substituting (7) into (6), the following is established.

$$E^2 = \sum_{i=-n}^{n} \int_s W_i \{\phi_{IN}(x, y) + \phi_H^{(i)}(x, y) - \phi_{OUT}^{(i)}(x, y)\}^2 ds \quad (8)$$

The (x, y) is a coordinate of the incident wave into the scanning holographic lens 122 in a reconstructing region S. The optimum phase $\phi_{IN}$ of the incident wave 126 shall be decided such that $E^2$ becomes the minimum. The relationship between the $\phi_{IN}$ which minimizes the equation (8) and the no-aberration phase $\phi_{OUT}^{(i)}(x, y)$ is as follows:

Setting $$\frac{\partial E^2}{\partial \phi_{IN}} = 0,$$

the following is established.

$$\phi_{IN}(x, y) = \frac{\sum_{i=-n}^{n} W_i \{\phi_{OUT}^{(i)}(x, y) - \phi_H^{(i)}(x, y)\}}{\sum_{i=-n}^{n} W_i} \quad (9)$$

$\forall (x, y) \epsilon S$

The meaning of the equation (9) is that the optimum phase $\phi_{IN}(x, y)$ of the incident wave is the weighted average value of the phases which are diffracted waves of the waves $\phi_{OUT}^{(i)}(x, y)$ by the phase transfer function $\phi_H^{(i)}(x, Y)$.

From the above equation, the holographic lens 112 in the embodiment shown in FIG. 9 is fabricated such that the holographic lens 112 can convert the divergent wave 125 from the semiconductor laser 121 into the optimum incident wave 126 having the incident phase $\phi_{IN}$ represented by the equation (9) on the scanning holographic lens 122.

As an embodiment of the scanning holographic lens 122, an above mentioned will be applied.

Figure 8:
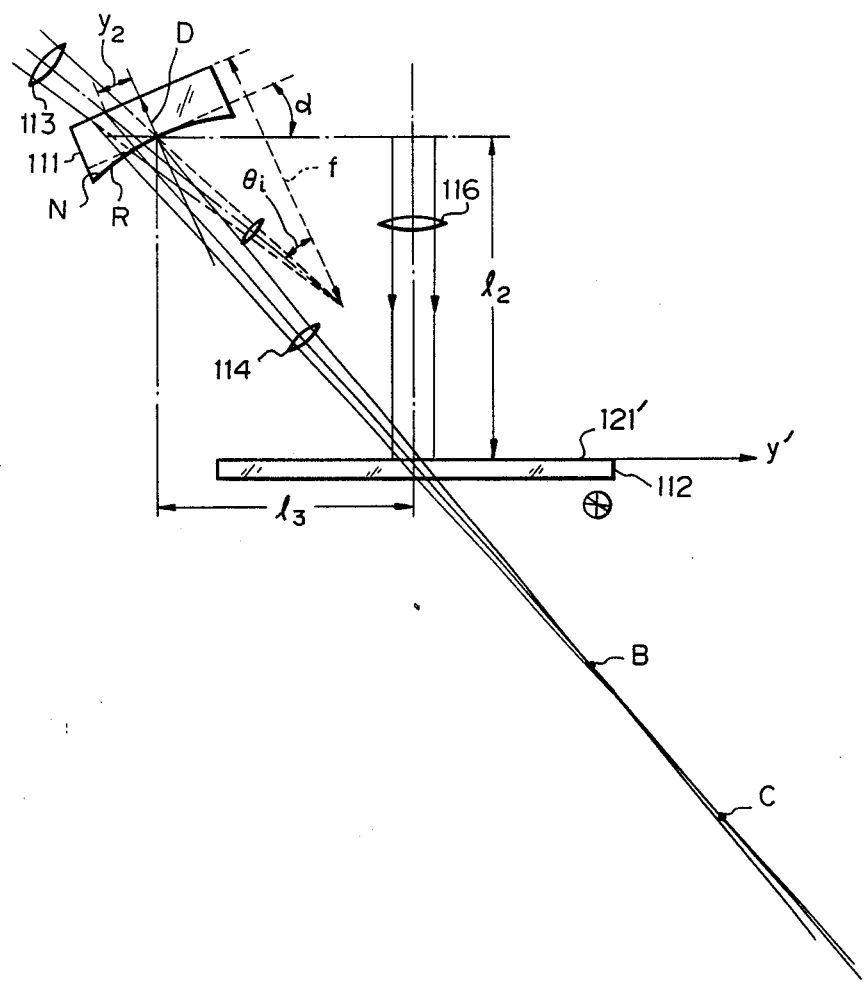
FIG. 8 is a view showing the constitution of an embodiment of a method for fabricating a holographic lens of a laser beam scanner according to the present invention.

The wave front expressed by the equation (9) is a complex wave front indicating the astigmatism and coma aberration, and the construction wavelength $\lambda_1$ is shorter than the reconstruction wavelength $\lambda_2$ so that the aberration will be developed. It has been found from the ray tracing that such a wave front can be generated by making incident a convergent spherical wave 113 having a wavelength of $\lambda_1$ obliquely into a concave lens as shown in FIG. 8. Therefore, the optimization has been carried out by the damping least square method (DLS method) in an automatic designing such that the phase of an incident wave 126 (FIG. 9) having a wavelength of $\lambda_2$ for the reconstruction come closest to the $\lambda_{IN}$.

Concrete Design Parameters of the Optical Beam Scanner

Figure 10:
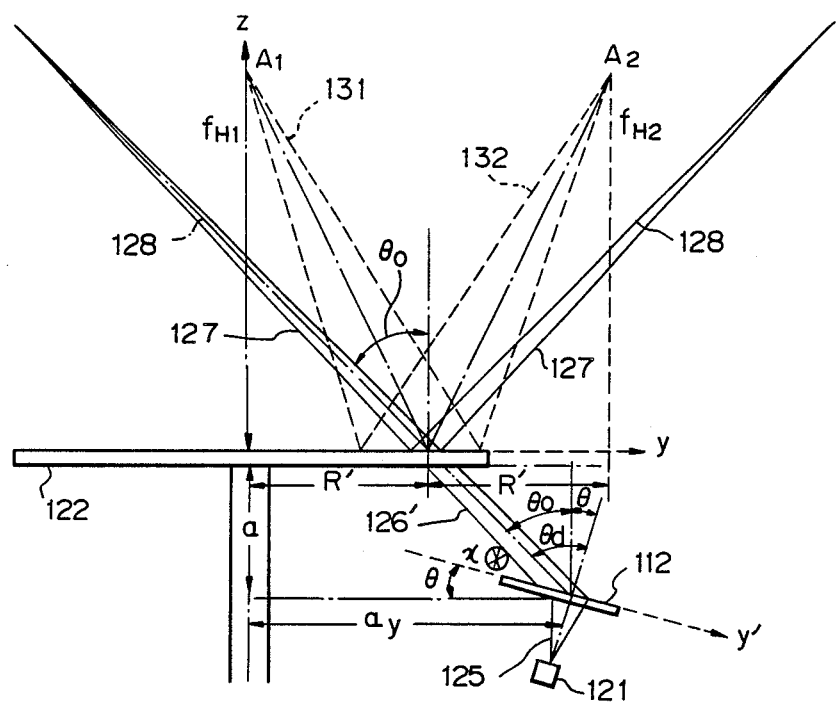
FIG. 10 is a view showing a concrete design embodiment of the laser beam scanner.

Concrete design parameters to be applied for the laser beam scanner shown in FIG. 9 will be described with reference to FIG. 10. The wavelength of a semiconductor laser of a reconstruction beam source is 787 nm. Each of construction waves 131 and 132 of a holographic disk 122 is a He-Cd laser beam of 325 nm in wavelength. Distances from outgoing points $A_1$ and $A_2$ to a disk surface are $f_{H1}=f_{H2}=125.7$ mm. An effective radius of the hologram disk 122 so formed is $R'=40$ mm. The incident angle of an incident wave 126 or an outgoing angle of a scanning beam 127 is $\theta_0=47.25°$. In FIG. 10, parameters are set as follows: $a=10$ mm, $a_y=50.82$ mm, an inclination angle $\theta=17.03°$, and an outgoing angle of the diffracted wave 126 of the hologram lens 112 $\theta_d=64.28°$. As already described, the above setting method is to prevent the scanning characteristics from deteriorating due to a variation of the wavelength of the semiconductor laser.

Concrete Design Parameters of the Embodiment of the Invention

The design parameters of the aberration correcting holographic lens 112 in the laser beam scanner will now be described.

Concrete values for the optimization of the parameters shown in FIG. 8 are as follows:

The convergent spherical wave 113 and the reference wave 116 are the Ar laser beams of wavelength $\lambda_1 = 488$ nm. For the concave lens 111, a material is BK7, a refractive index at wavelength $\lambda_1$ being $N = 1.522$, a center thickness being $D=20.99$ mm, a curvature being $R=65$ mm, an inclination angle with respect to the hologram substrate 112 being $\alpha=16.95°$, $l_2=140$ mm, and $l_3=83.08$ mm. For the convergent spherical wave 113, an optical axis position is $Y_2=14.943$ mm, a focal length being $f=111$ mm, and an inclination angle $\theta=21.69°$. A reference wave 116 is a vertical plane wave.

Spot Diagram of the Scanning Beam of the Present Invention

Figure 11:
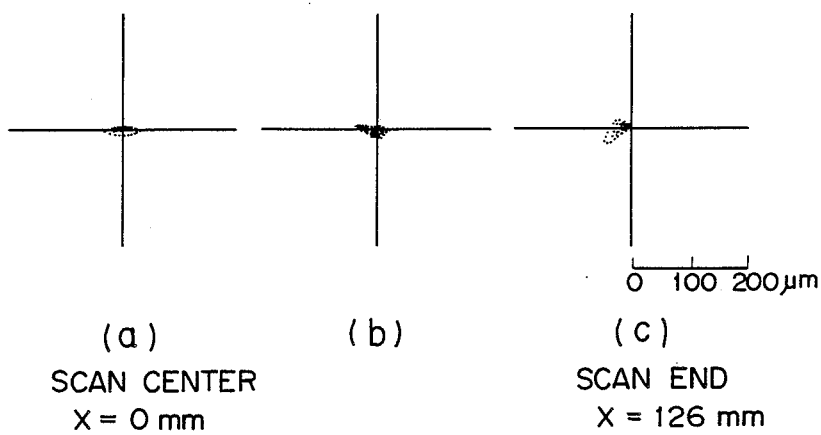
FIGS. 11(a), (b), and (c) are spot diagrams showing scanning beams generated by a holographic lens according to the present invention.
Figure 12:
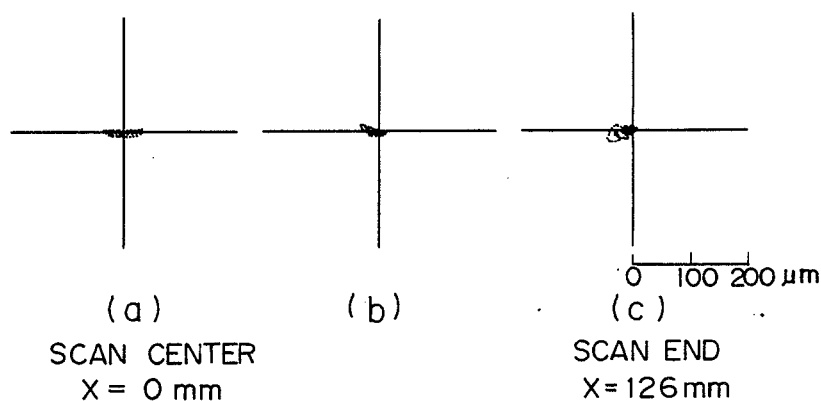
FIGS. 12(a), (b), and (c) are spot diagrams showing scanning beams according to an optimum incident wave $\phi_{IN}$ (the equation (9))

FIG. 11 shows a spot diagram showing the scanning beam 127 obtained from the laser beam scanner (FIGS. 9 and 10) which is constituted as mentioned in the above. Since the reference wave 116 is a vertical plane wave in FIG. 8, a wave front made incident into the aberration correcting holographic lens 112 shown in FIG. 9 is a vertical plane wave of the semiconductor laser. Here, an incident beam diameter for the scanning beam is determined such that a diffraction limited spot size becomes 100 μm. FIG. 12 is a theoretical spot diagram showing the scanning beam 127 obtained from the equation (9). From the figures, it will be understood that an excellent aberration correction result which is nearly ideal has been obtained for respective scanning regions. Thus, an laser beam scanner of high resolution more than 300 dpi can be obtained.

Here, the scanning width is the B4 size (252 mm), and an image formation distance is 303 mm.

In FIG. 9, to convert a divergent wave 125 from the semiconductor laser 121 instead of the vertical plane wave of the semiconductor laser into the above aberration correcting wave 126 by the holographic lens 112, the reference wave 116 shown in FIG. 8 shall be changed from the vertical plane wave to a spherical aberration wave using a convex lens as already mentioned in FIG. 7. Thus, the divergent wave of the semiconductor laser is converted virtually into the vertical plane wave by the holographic lens 112, and the plane wave is converted into the aberration correcting wave 126.

The arrangement of the holographic lens 112 and the holographic disk 122 shown in FIG. 9 is made such that the influence of the mode hopping of the semiconductor laser 121 and the influence of the variation of oscillation wavelength due to the variation in production lots will be prevented and such that the beam shaping will be performed simultaneously as described previously.

As described in the above, this embodiment is characterized in that the scanning holographic lens 122 with variable spatial frequency is provided to diffract the incident wave 126 from the semiconductor laser to perform the beam scanning, and the aberration correcting holographic lens 112 being provided to convert the divergent wave 125 irradiated from the semiconductor laser into the incident wave 126 having a wave front which uniformly reduces an aberration at a plurality of convergent points 128 for entire scanning region of the scanning beam 127 from the scanning holographic lens 122.

Further, the method for fabricating the laser beam scanner of this embodiment is characterized in that a laser beam having a wavelength $\lambda_1$ which is shorter than a wavelength $\lambda_2$ of a reconstruction wave which is in a laser beam is used, a spherical aberration wave being used as a reference wave, and a coma aberration wave being used as an object wave to construct the aberration correcting holographic lens.

According to the above laser beam scanner, the problems of the aberration of scanning beam and the mode hopping can be solved simultaneously. However, in the above disclosure, a scanning beam diameter will be deteriorated if a wavelength is shifted from a designed wavelength of, for instance, 787 nm by ±10 nm due to the variation of an oscillation wavelength of the semiconductor laser due to its production lot.

To solve the above problem, it is considered to design and fabricate the hologram depending on the wavelength. However, this is not a practical way. Particularly, the variation of the oscillation wavelength of the semiconductor laser due to its production lot is preferable to be absorbed without changing the designed hologram, and the adjustment is required to be simple.

To solve the above problem, an object of the invention is to provide an laser beam scanner, in which the setting of a scanning holographic lens and an aberration correcting holographic lens is carried out at the time of the hologram designing, a gap between the semiconductor laser and the aberration correcting holographic lens being optimized as and when required to provide the laser beam scanner which can prevent the deterioration of the scanning beam diameter.

To achieve the object, the present invention provides an laser beam scanner comprising a scanning holographic lens with variable spatial frequency to diffract a reconstruction wave irradiated from a semiconductor laser to scan the diffracted wave on a surface to be scanned, and an aberration correcting holographic lens disposed in an optical path of the reconstruction wave between the semiconductor laser and the scanning holographic lens to change a wave front of the reconstruction wave into a wave front which reduces an aberration of the diffracted wave on the surface to be scanned, the setting of the scanning holographic lens and the aberration correcting holographic lens being optimized at the time of hologram design, a distance between the semiconductor laser and the aberration correcting holographic lens being set optimally as and when required.

According to the above arrangement, the setting of the scanning holographic lens and the aberration correcting holographic lens is carried out properly at the time of hologram designing so that the beam diameter deterioration of the diffracted wave on the surface to be scanned can be suppressed with respect to the wavelength variation of about ±10 nm.

When the divergent wave from the semiconductor laser is made incident directly into the aberration correcting holographic lens, a gap between the semiconductor laser and the aberration correcting holographic lens is set optimally to prevent the deterioration of the beam diameter.

The embodiment of the present invention will be described in detail.

Constitution of the Embodiment of the Laser Beam Scanner

Figure 28:
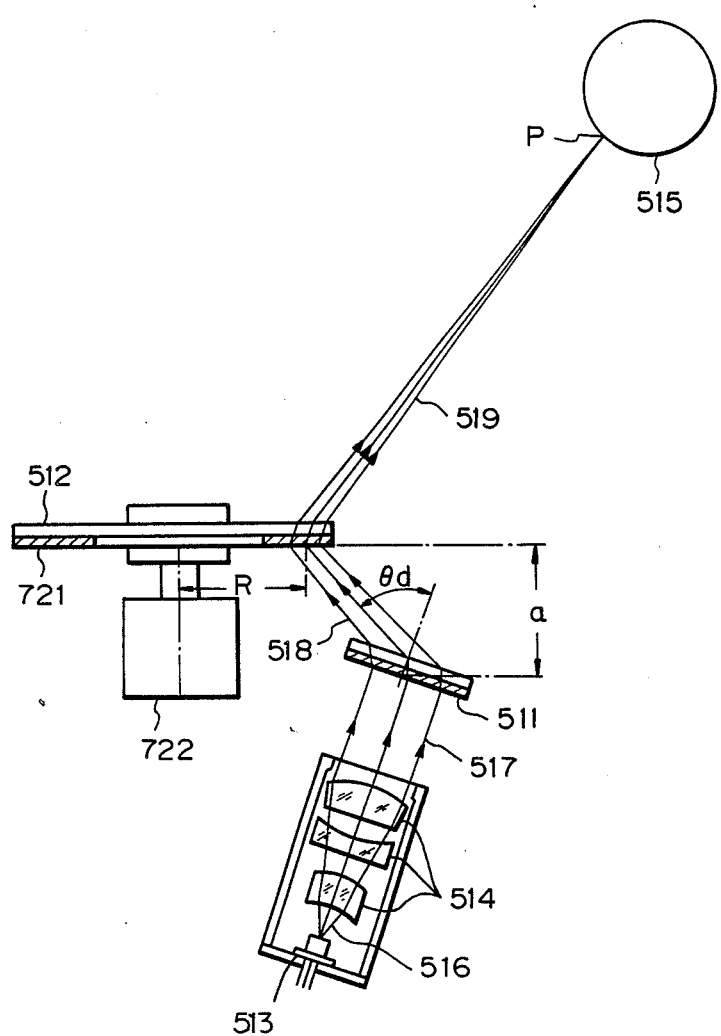
FIG. 28 is a view showing an embodiment of a laser beam scanner according to the present invention.

FIG. 28 is a side view showing an embodiment of an laser beam scanner according to the present invention. A divergent spherical wave 516 from a semiconductor laser 513 is converted into a plane wave 517 by a collimate lens 514 and made incident to a holographic lens 511. A diffracted wave 518 as a reconstruction wave from the holographic lens 511 is made incident to a plurality of holograms 721 arranged on a holographic disk 512 with a radius of R, and converted into a convergent spherical wave 519 which is a diffracted wave to form an image at an image formation point P on a photoconductor drum 515. This arrangement is the same as that of an embodiment as mentioned previously. In this embodiment, however, limiting conditions are provided for the setting of the holographic lens 511 and the holographic disk 512.

Description of the Embodiment Illustrated in FIGS. 28 and 29

In the above arrangement, the holographic lens 511 provides a wave front having an aberration which cancel the astigmatism and coma aberration at the image formation point P on the photoconductor drum 515 caused by the convergent spherical wave 519 generated by the hologram 721 on the holographic disk 512. Accordingly, the actual aberration of the convergent spherical wave 519 is corrected so that the astigmatism and coma aberration of the photoconductor drum 515 will be reduced.

On the other hand, a diffraction angle $\lambda_d$ of the diffracted wave 518 of the holographic lens 511 is set such that a change of the image formation point P on the photoconductor drum 515 is reduced with respect to the longitudinal mode hopping in the semiconductor laser 553. Accordingly, the jitter of the converging spherical wave 519 is reduced. These techniques are mentioned previously.

There is a freedom in a distance "a" between a regeneration center of the hologram 511 and the holographic disk 512. Supposing that a=50 mm, if the semiconductor laser 513 which is shifted by ±10 nm from a designed wavelength of 787 nm is used, the beam diameter at the image formation point P reaches to 1 to 2 mm as described before so that the beam cannot be converged. By bringing the value of "a" to about 20 mm, it has been found through the ray tracing that the beam diameter does not change largely at the image formation point P even if the oscillation wavelength of the semiconductor laser 513 is shifted by about ±10 nm. This is because an optical axis incident point to the scanning holographic lens 721 is shifted from a designed optical axis incident point R if the semiconductor laser which is shifted by ±10 nm from the designed wavelength 787 nm is used. If a=50 mm, the shift from the incident point R is ±2 mm, and if a=20 mm, the shift is about ±1 mm.

If the shift from the designed incident point R is large, the beam diameter is enlarged. Therefore, the smaller the amount of shift ΔR, the better. Practically, it is acceptable if the amount of shift ΔR is within 1 mm. Therefore, the scanning holographic lens 512 and the aberration correcting holographic lens 511 shall be set at the time of designing such that the amount of shift is within the value. How to set is mentioned previously. As an example, a scanner which shift amount ΔR is ±600 μm has been designed according to the method. In this case, the beam diameter becomes the one shown in FIG. 29. FIG. 29(a) shows a beam diameter regenerated by a designed wavelength, FIGS. 29(b) and (c) showing beam diameters with shifts of −10 nm and 10 nm respectively. In these cases, a beam is made incident into the scanning holographic lens 512 such that a beam of about 150 μm can be obtained for a diffracted image. It will be understood that the deterioration of the beam diameter can be prevented well without changing the setting of the scanning holographic lens 512 and the aberration correcting holographic lens 511.

To bring the amount of shift ΔR within ±1 mm, not only the gap between the scanning holographic lens 512 and the aberration correcting holographic lens 511 but also the spatial frequency of the aberration correcting holographic lens will be parameters to be set.

Constitution of Another Embodiment the Laser Beam Scanner of the Invention

Figure 30:
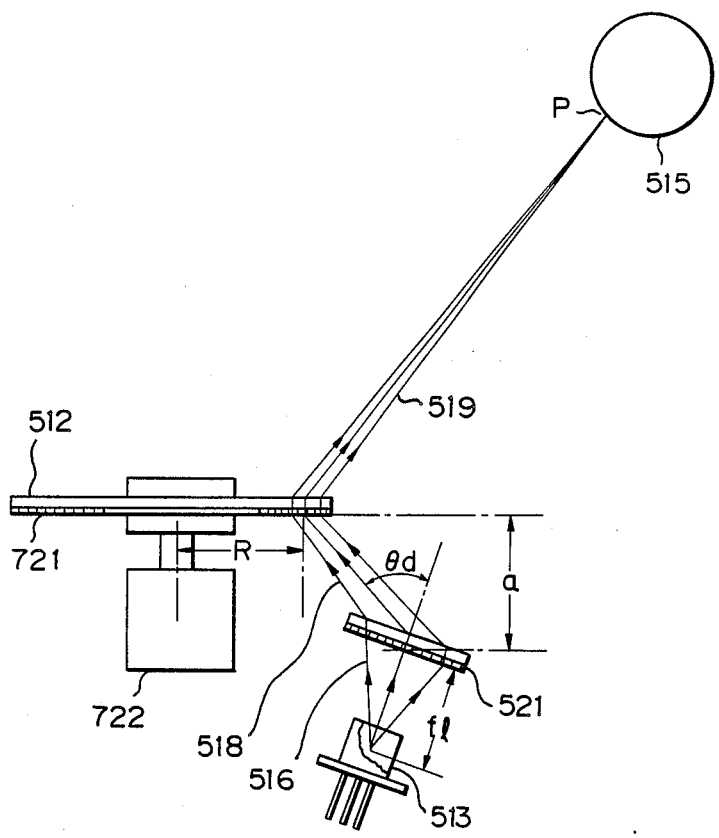
FIG. 30 is a view showing an embodiment of a laser beam scanner according to the present invention.

FIG. 30 is a view showing the constitution of another embodiment. This embodiment differs from the embodiment shown in FIG. 28 in that a divergent spherical wave 516 from a semiconductor laser 513 is made incident to a holographic lens 521 directly which is provided with a lens action (a converting action into a plane wave).

In the above embodiment, the setting is carried out, and a distance fl (a focal length of the divergent spherical wave 516) from the semiconductor laser 513 to the regenerating center point of the holographic lens 521 is optimized according to the oscillation wavelength of the semiconductor laser 513 so that the beam diameter deterioration at the image formation point P on the photoconductor drum 515 can be suppressed. Not like the previous embodiment, the divergent wave of the semiconductor laser is converted into a virtual plane wave by the holographic lens 521, and the virtual plane wave is converted into a diffracted wave 518 which is an aberration correcting wave to the scanning holographic lens. If the oscillation wavelength of the semiconductor laser is shifted from the designed value by $\Delta\lambda_2$, the function to convert the divergent wave of the semiconductor laser into the plane wave is weakened so that the scanning beam diameter may be deteriorated.

Figure 31:
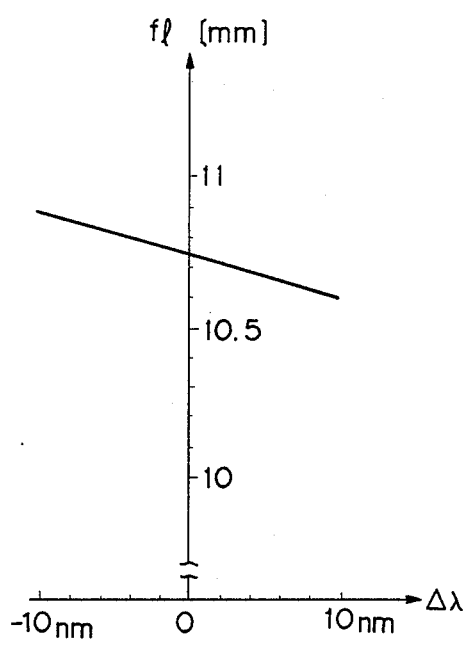
FIG. 31 is a view showing the relationship between the shift $\Delta\lambda_2$ of a semiconductor laser 13 from a designed wavelength and a distance fl from the semiconductor laser 13 to the reconstruction center of a holographic lens 21.

Therefore, according to the shift $\Delta\lambda_2$ of the oscillation wavelength of the semiconductor laser, it is considered to optimize the fl to produce the virtual plane wave. To change the divergent wave of the semiconductor laser into the virtual plane wave, a wave front aberration shall be set to within ¼ λ. FIG. 31 is a view showing the fl calculated for each $\Delta\lambda_2$ to attain the above condition. In this embodiment, a design example as mentioned previously is used. In this way, the fl shown in FIG. 31 is set with respect to the shift $\Delta\lambda_2$ of the oscillation wavelength of the semiconductor laser from the hologram design values so that the divergent wave of the semiconductor laser can be converted virtually into an almost complete plane wave having the wave front aberration within ¼ λ. The plane wave becomes the aberration correcting wave 518 to the scanning holographic lens according to the previous embodiment, thereby preventing the deterioration of the scanning beam diameter.

As described in the above, this embodiment is characterized in that the scanning holographic lens 512 with variable spatial frequency diffract the regenerated wave 518 irradiated from the semiconductor laser 513 and to scan the diffracted wave 519 on the surface 515 to be scanned is provided, and the aberration correcting holographic lens 511 or 521 which is disposed on an optical path of the reconstructed wave 518 between the semiconductor laser 513 and the scanning holographic lens 512 being provided to convert a wave front of the reconstructed wave 518 into a wave front which reduces an aberration of the diffracted wave 519 on the surface to be scanned. When the oscillation wavelength of the semiconductor laser 513 is shifted from a hologram design value by maximum ±10 nm, the scanning holographic lens 512 and the aberration correcting holographic lens 511 or 521 are set at the time of designing such that an incident point of an optical axis of the reconstructed wave 518 made incident to the scanning holographic lens 512 becomes less than ±1 mm from a designed incident point. With respect to the shift $\Delta\lambda_2$ of the oscillation wavelength of the semiconductor laser 513, a gap between the aberration correcting holographic lens 511 or 521 and the semiconductor laser 513 is set such that the deterioration of the scanning beam diameter is absorbed.

Namely, this embodiment provides an laser beam scanner comprising a semiconductor laser, an aberration correcting holographic lens, and a scanning holographic lens, in which the proper setting of the scanning holographic lens and the aberration correcting holographic lens is carried out at the time of hologram designing, and a gap between the semiconductor laser and the aberration correcting holographic lens is optimized as and when required so that the deterioration of beam diameter of scanning beam due to a variation of the oscillation wavelength of a semiconductor laser due to its production lot can be suppressed to realize the inexpensive and highly accurate scanning.

According to the present invention, a gap between the scanning holographic lens and the aberration correcting holographic lens is narrowed, and a gap between the semiconductor laser and the aberration correcting holographic lens being optimized so that the deterioration of the scanning beam diameter with respect to the variation of the oscillation wavelength of the semiconductor laser can be prevented to provide a precision laser beam scanner.

Figure 40:
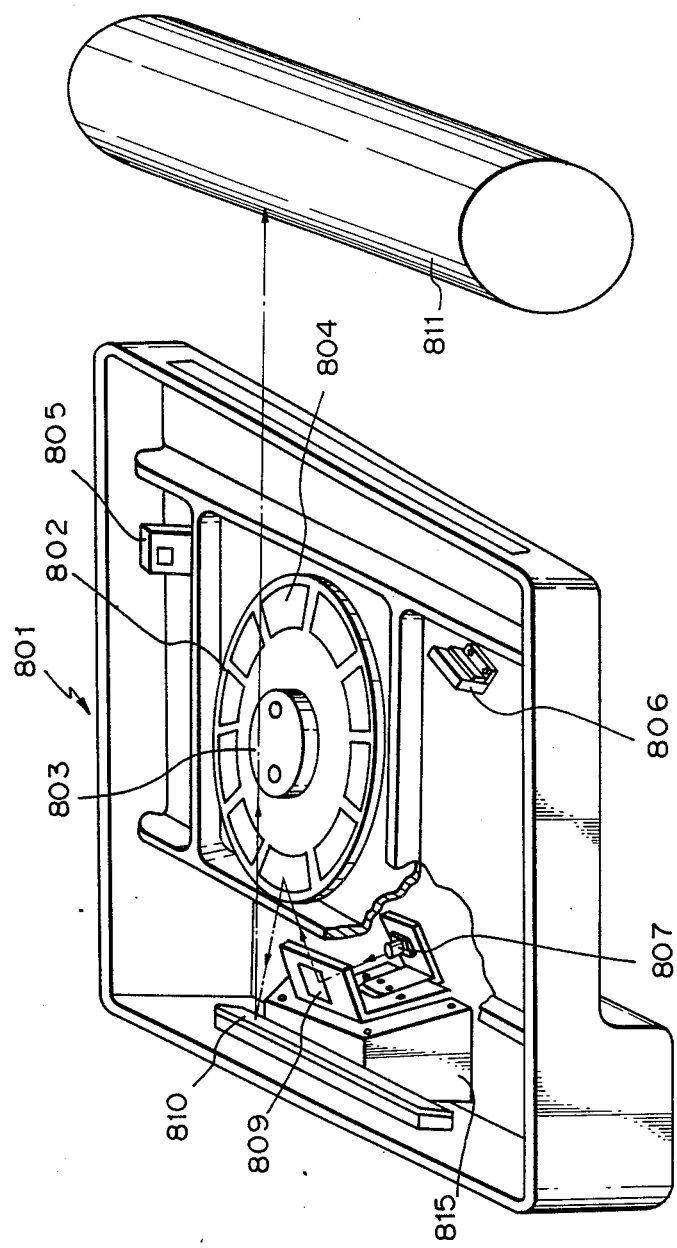
FIG. 40 is a schematic constructional view of a holographic scanner according to the present invention.

An outer view of the holographic scanner in accordance with the present invention is illustrated in FIG. 40. A laser scanning unit 801 comprises a holographic disc 802. The holographic disc 802 is rotatable about a shaft 803. The shaft 803 is connected to a motor (not shown). A plurality of hologram facets is formed on an upper surface of the holographic disc 802. Ten facets are formed in this particular embodiment. 805 designates an optical sensor which detects synchronized signals in cooperation with a mirror 806. A semiconductor laser device 807 is attached to a support block 815. A laser beam from the semiconductor laser device 807 is, as shown by a dash-dot line, diffracted by an aberration correction holographic lens 809 and irradiates holographic disc 802. The laser beam is diffracted by each facet 804 of the holographic disc 802, and then reflected by a mirror 810 to form a scanning beam which irradiates a photoconductor drum 811.

Figure 41:
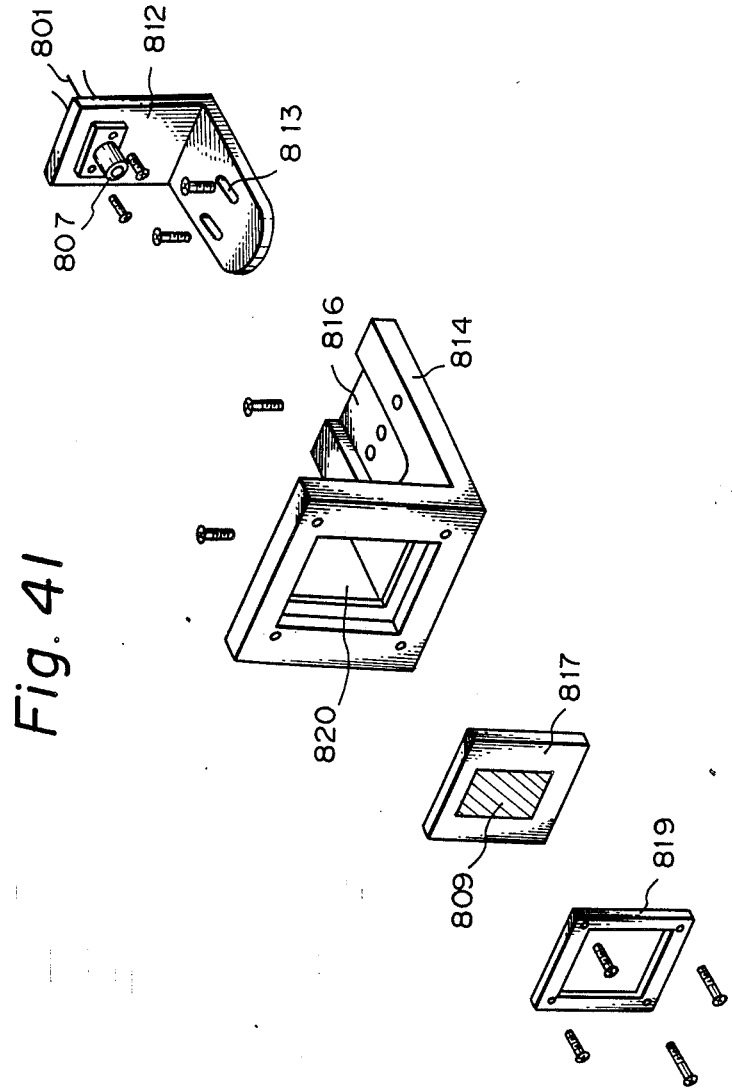
FIG. 41 is a partial detailed explosive view of the scanner of FIG. 40.

The attaching portion of the aberration correction holographic lens 809 is explosively illustrated in FIG. 41. The semiconductor laser device 807 is secured to an L-shaped attachment piece 812 by screws. 801 designates lead terminal pins of the semiconductor laser device. The attachment piece 812 is installed in a groove 816 of an L-shaped holder 814. An opening 820 is formed in the holder 814. A hologram plate 817 on which the aberration correction holographic lens is fabricated is installed and secured within the opening 820 by screws through a frame 819.

The semiconductor laser device attachment piece 812 is secured to the holder 814 with the use of screws through elongated slots 813. Therefore, the distance between the semiconductor laser device 807 and the aberration correction holographic lens 809 is adjustable by loosening the screws.

Figure 14:
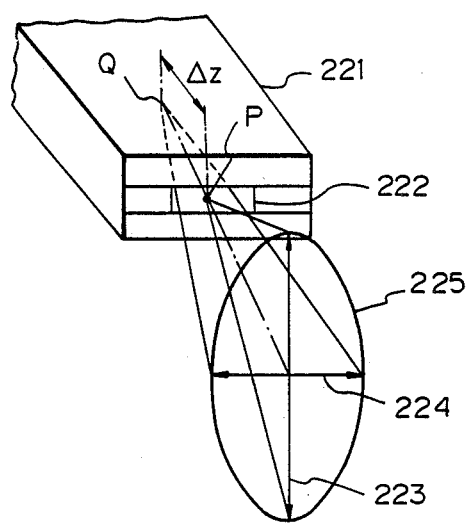
FIG. 14 is an explanatory view of an astigmatism.

Although a hologram with no aberration can be obtained theoretically according to the above method, there is a problem actually that an astigmatism exists in the semiconductor laser itself. When a wave guided type of semiconductor laser is carried out by a gain component in the semiconductor laser, a transferring direction and a wave front of an optical energy are not sometimes orthogonal with each other. In a guided wave parallel to a junction direction of the semiconductor element, the gain component is slightly mixed even in an index waveguided type laser. As a result, the waist of a beam in a direction parallel to the junction is located inward from a laser end by $\Delta Z$ as shown in FIG. 14. The difference is the astigmatism. The value of $\Delta Z$ is usually 10 μm or less in the index waveguided type laser, but is very large as 10 to 50 μm in a gain waveguided type laser. If the semiconductor laser having the astigmatism is used, a spot of the diffraction limit may not be obtained depending on an image formation magnitude even if the beam is converged by using the aforementioned holographic lens.

In order to correct the astigmatism of the semiconductor laser, there are proposed prior art methods in which a cylindrical lens is used. These prior art methods have drawbacks that the number of components are increased, and the adjustment is difficult.

To solve the above problem, an object of this embodiment is to provide a method for forming a hologram with a simple constitution, in which a spherical optical element is used to eliminate simultaneously the influence of a difference in a reconstruction wavelength and a construction wavelength and the influence of an astigmatism generated by the semiconductor laser.

In order to eliminate the above problem, this embodiment is provided with a first spherical optical element and a second spherical optical element, at least one of the first and second spherical optical elements being a cylindrical lens, and an reference wave having an astigmatism being generated through the optical elements to fabricate a hologram.

According to the above arrangement, a convergent spherical wave having a wavelength $\lambda_1$ which is shorter than a reconstruction wavelength $\lambda_2$ is made incident into the first and second spherical optical elements, at least one of which being the cylindrical lens, to generate an astigmatism generated in the semiconductor laser in considering a difference between the reconstruction wavelength $\lambda_2$ and the construction wavelength $\lambda_1$. The laser beam thus obtained is used as a reference wave to fabricate a hologram. As a result, the hologram which causes no aberration with the reconstruction wavelength $\lambda_2$ can be formed by using the construction wavelength $\lambda_1$ which is shorter than the reconstruction wavelength $\lambda_2$. The hologram can also eliminate the influence of the astigmatism caused in the semiconductor laser in a specific wave guiding direction.

The embodiment will be described in detail.

Figure 13A:
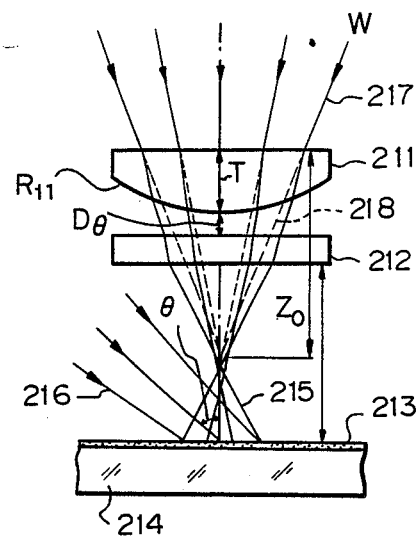
FIGS. 13(a) and (b) are views showing the constitution of an embodiment of the present invention.
Figure 15:
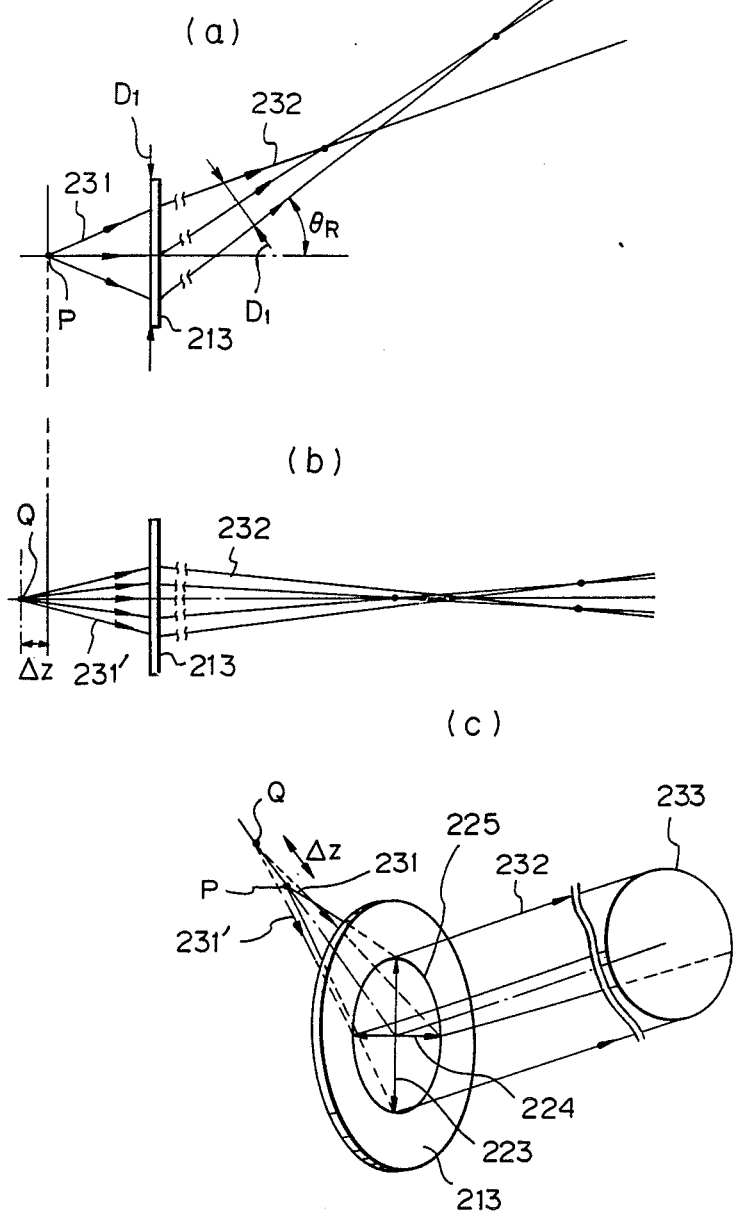
FIGS. 15(a), (b), and (c) are explanatory views of the principle of the present invention.

Embodiment of the Present Invention Illustrated in FIGS. 13 to 15

If there is an astigmatism in an outgoing beam from a semiconductor laser diode chip 221 in FIG. 14, a wave guiding direction 224 is in parallel to a junction direction of an active layer 222, and a virtual outgoing point is a point Q which is located inward from an active layer end face (point P) by $\Delta Z$. On the other hand, an outgoing point of the outgoing beam in a direction 223 orthogonal to the wave guiding direction is the point P at the active layer end face. Namely, the astigmatism is the difference $\Delta Z$ between the points P and Q. To fabricate a no-aberration holographic lens by using such a semiconductor laser, it is supposed that a construction wavelength is $\lambda_2$ (a wavelength of the semiconductor laser beam). As shown in FIGS. 15(a), (b), and (c), an astigmatism wave 231 and 231' (the same waves in different outgoing directions) which is longer in outgoing direction 224 than outgoing direction 223 (FIG. 14) by the astigmatism $\Delta Z$, is used as a reference wave, and an objective wave 232 which is the aberration corrected wave 5 in FIG. 2.

Figure 13B:
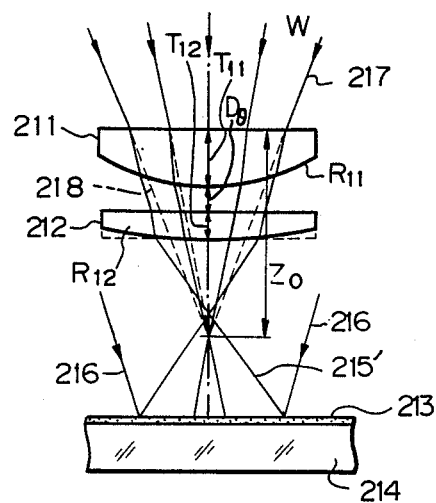

Since there is generally no hologram photosensitive material which is efficient at the wavelength $\lambda_2$ of the semiconductor laser beam, it is considered to form the hologram with a laser beam having the wavelength $\lambda_1$ which is shorter than the wavelength $\lambda_2$. To obtain with the reconstruction wavelength $\lambda_2$ the hologram which allows the astigmatism shown in FIG. 15, in FIG. 13 an optical system is used which generates, with the fabricating wavelength $\lambda_1$, a reference wave 215 and 215' (the same wave in different outgoing directions) having an astigmatism corresponding to $\Delta Z$ in the outgoing direction 224 according to the difference with respect to the reconstruction wavelength $\lambda_2$. Therefore, the convergent spherical wave 217 and 217'(the same) of wavelength $\lambda_1$ is made incident into a spherical convex lens 211 to generate a negative spherical aberration wave which is intersected to provide a positive spherical aberration wave which is guided onto the hologram material 213 formed on a substrate 214. Since the cylindrical lens 212 has a curvature R' in the outgoing direction 224 as shown in FIG. 13(b), the reference wave 215 (FIG. 13(a)) in the outgoing direction 223 and the reference wave 215' (FIG. 13(b)) in the outgoing direction 224 differ from each other by distances from intersections to the hologram material 213 that causes an astigmatism corresponding to the one shown in FIG. 15. In addition to the reference wave 215 and 215', an object wave 216 which is the aberration corrected wave 13 in FIG. 3(b) or 114 in FIG. 8 of wavelength $\lambda_1$ is used.

Embodiment of the Hologram Formed According to the Invention

FIGS. 16(a) and (b) are views showing an example in which the hologram 213 constructed according to the present invention is reconstructed by a semiconductor laser beam 231 or 231' having a reconstruction wavelength $\lambda_2$. A semiconductor laser diode 241 comprises a semiconductor diode chip 221, a glass window 242, etc. An outgoing beam from the semiconductor diode chip 221 actually receives a spherical aberration by the glass window 242 and is made incident into the hologram 213. Therefore, when constructing the hologram according to the embodiment shown in FIG. 13, design parameters are set such that the aberration will also be corrected.

Design Parameters of the Embodiment of FIG. 13

Figure 16:
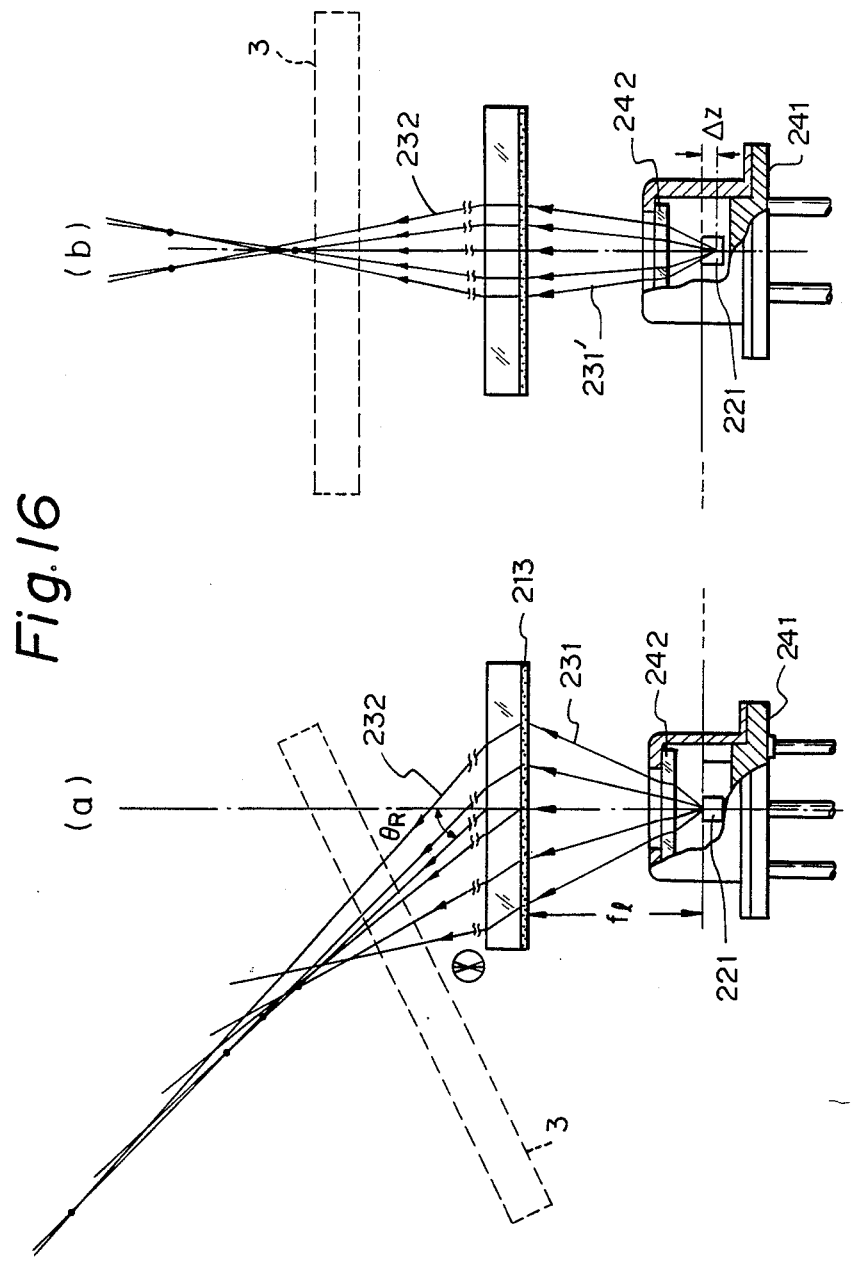
FIGS. 16(a) and (b) are views showing the constitution of an embodiment of a hologram according to the present invention.

Concrete design parameters of the embodiment shown in FIG. 13 will be specified. An oscillation wavelength $\lambda_2$ which is a reconstructing wavelength, of the semiconductor diode chip 221 (FIG. 14) is set to be $\lambda_2 = 87$ nm as mentioned previously. A thickness of the glass window 242 shown in FIG. 16 is set to be $T_{42} = 0.3$ mm, and a refractive index thereof being $N_{42} = 1.5$. An aberration distance of the semiconductor laser diode chip 221 is supposed to 10 $\mu$m. In the hologram fabricating optical system shown in FIG. 13, the design parameters have been optimized by using the damping least square method (DLS method) such that the wave front aberration of the reference wave will be minimized. As a result, the following has been set: a hologram construction wavelength $\lambda_2 = 488$ nm (Ar laser); a center thickness of the spherical convex lens 211 $T_{11} = 5.5$ mm, a curvature thereof $R_{11} = 26$ mm, a refractive index thereof $N_{11} = 1.73903$; a distance from the upper surface of the spherical convex lens 211 to a convergent position of the no-aberration wave 218 $Z = 32.96$ mm; a gap between the spherical convex lens 211 and the cylindrical lens 212 $D = 1$ mm; a center thickness of the cylindrical lens 212 $T_{12} = 4$ mm, a curvature thereof $R_{12} = 5000$ mm, a refractive index thereof $N_{12} = 1.522$; and a distance from the cylindrical lens 212 to the hologram material 213 $DL = 31.4$ mm.

Example of Wave Front Aberration Measurement

Figure 17:
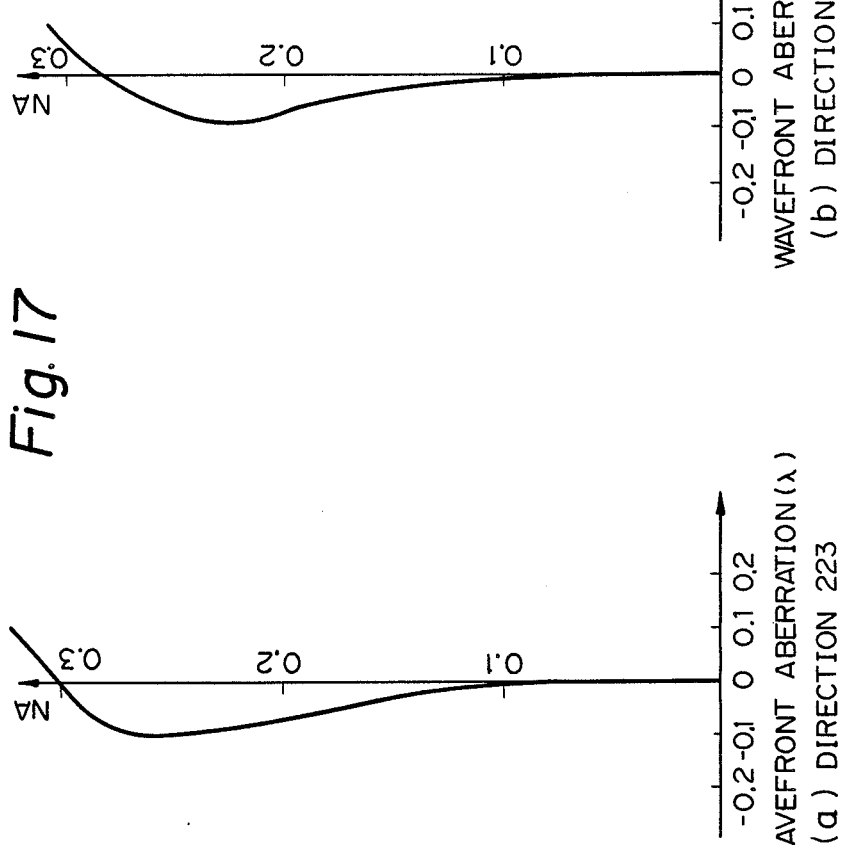
FIGS. 17(a) and (b) are views showing a wave front aberration generated by a hologram according to the present invention.

FIG. 17 is a view showing a wave front aberration amount of the reference wave generated by the hologram designed according to the above conditions. In FIG. 16(a), a distance from the hologram 213 to the semiconductor laser diode chip 221 is set to be fl = 11.5164 mm in FIG. 2. As apparent from FIG. 17, a wave front aberration is within $\lambda/8$ for higher NA, and the reference wave is close to the diffraction limit.

The reference wave can be understood a well aberration corrected one.

So, the aforementioned aberration corrected wave 13 in FIG. 3(b) or 114 in FIG. 8 will not be deteriorated, and the required beam spot will be obtained.

The wave front aberration of a no-aberration optical lens to which the aberration distance correction is not performed will stay within λ/8 with respect to the given ΔZ and reconstruction wavelength λ₂, if a lens with NA satisfying the following is provided.

$$NA \leq \sqrt{\frac{\lambda}{2 \cdot \Delta Z}} \quad (10)$$

In the case of the above conditions, the NA shall be 0.2 or less from the equation (10) so that the lens may be dark. However, according to the present invention, a holographic lens which has high NA with the astigmatism being corrected, is compact, lightweight, and inexpensive in comparison with the one formed according to the prior art method.

In the above-mentioned aberration correction holographic lens, the holographic lens is constructed by using a convergent spherical wave having aberration as the object wave. However, a divergent spherical wave having aberration may be used as the object wave.

Figure 18:
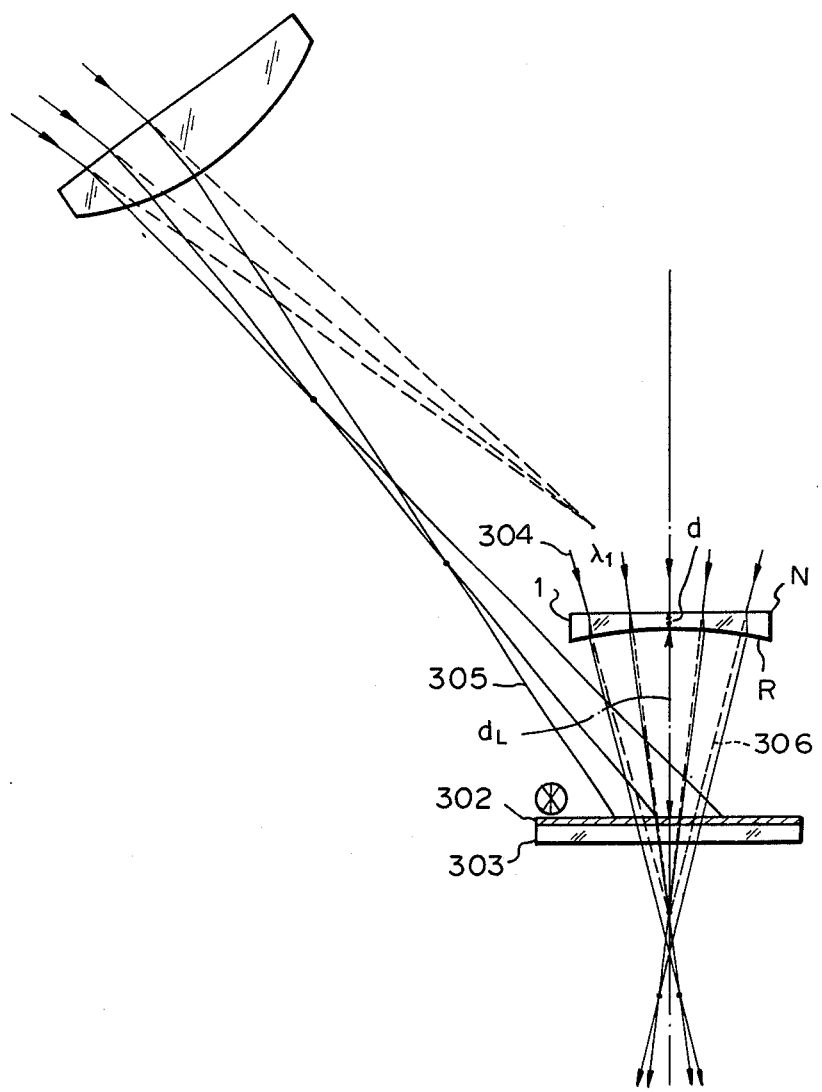
FIG. 18 is a side view showing the constitution of an embodiment of the present invention.

FIG. 18 is a side view showing an embodiment of a method for fabricating a hologram according to the present invention. Firstly, the reference wave will be discussed. A convergent wave 304 having a wavelength of $\lambda_1$ is made incident into a concave lens 1 to generate a spherical aberration wave which is made incident as an reference wave 304 to a hologram fabricating material 302 on a hologram substrate. Secondary, an aberration corrected wave as an object wave 305 is prepared.

The object wave for fabricating the hologram for correction of the scanning beam aberration must be a wave having outward coma aberration. Such a wave can be obtained by introducing a convergent spherical wave into an inclined convex lens and intersecting the outlet wave therefrom. As the reference wave, a convergent wave having aberration is used, the wave being obtained by introducing a convergent spherical wave into a concave lens. By using such an object wave and a reference wave, a desired laser beam scanner can be realized since the aberration of the reference wave is also appropriately corrected.

The embodiment of the present invention will be described in more detail.

The embodiment shown in FIG. 18 will be described. In FIG. 18, it will be understood that a converging wave 306 is given with a positive spherical aberration by a concave lens 301. Supposing a wavelength of the reconstruction wave is λ₂ and a wavelength of an object wave 304 λ₁, a spherical aberration is made to be equal to the positive spherical aberration which is increased according to the fact that the wavelength is shortened from λ₂ to λ₁. By optimizing parameters such as a curvature of the concave lens, the aberration correction of the reference wave can be performed precisely. In this embodiment, the damping least square method (DLS method) is used for the optimizing automatic design to minimize the wave front aberration.

Figure 19:
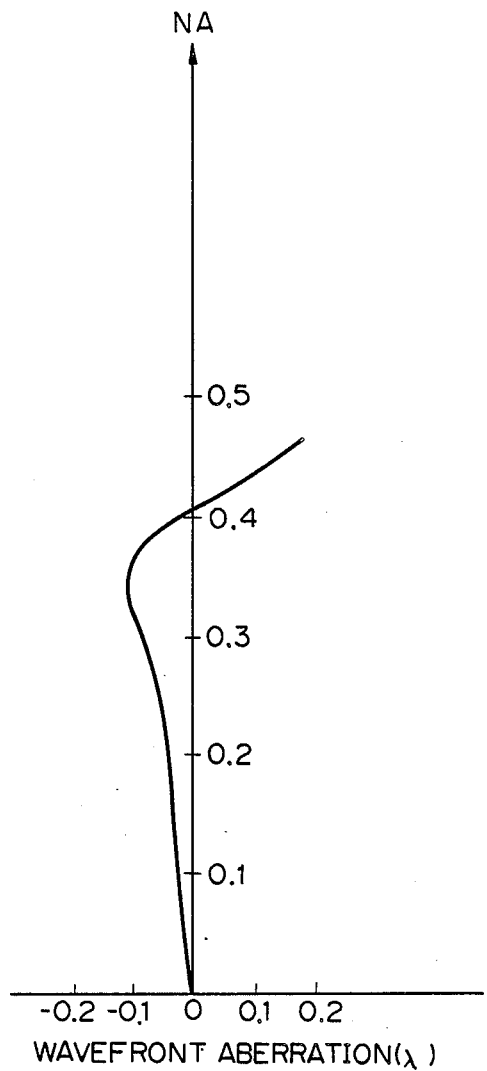
FIG. 19 is a view showing the relationship between the wave front aberration and the NA in the embodiment shown in FIG. 18.

In FIG. 18, an Ar laser beam having a wavelength of $\lambda_1 = 488$ nm is used as a fabricating wave. According to the above automatic design, parameters of the concave lens 301 are set as follows: a center thickness d = 4 mm; a curvature R = 200 mm; material BK7; and a refractive index by the Ar laser N = 1.52223. A distance of the convergent wave 306 which is the object wave 304 from the upper surface of the concave lens 301 to a convergent point is F = 30 mm, and a distance from the center of lens lower surface to the hologram forming material 302 is $d_L = 22.3$ mm. An aberration of the hologram substrate 303 (glass thickness t=0.3 mm, refractive index $N_G = 1.5$) has been considered also. When the reconstruction wave is a semiconductor laser diode beam ($\lambda_2 = 787$ nm), a focal length of the diffraction wave 307, fl, is 4.55172 mm. It will be seen in FIG. 19 that a wave front aberration with NA =0.45 is within λ/4. Thus, a reference wave of a diffraction limit can be obtained. Since the curvature R of the concave lens 301 has the freedom, it is possible to elongate the gap $d_L$ between the concave lens 301 and the hologram forming material 302 so that there will be an advantage that the object wave 305 can be made incident easily. The object wave 305 in FIG. 18 can be prepared in the similar way as mentioned above. The fabricated aberration correction holographic lens is used as shown in FIG. 2. The mark * is illustrated in FIG. 18.

The aforementioned aberration corrected holographic lens is formed by constituting a hologram on a flat plate. In such a holographic lens, image circle of a holographic lens will be small generally, and the holographic lens shall be set accurately for the reconstruction. Namely, if an incident position of an incident wave to the holographic lens is shifted slightly, a designed wave front conversion will not be carried out at the holographic lens.

To solve the above problem partially, there is a proposed a hybrid holographic lens for a collimating lens or an objective lens in which a hologram is formed on the convex surface side of a convex lens to satisfy the sine condition. (W. T. Welford, Opt. Commun., 9 (1973) 268, Opt. Commun., 15 (1975) 46.)

In the above, a curvature of the convex lens is determined to coincide with a focal length of the holographic lens so that the image circle will be enlarged. Such a lens having a large image circle is generally called the aplanatic lens.

In addition to the above prior art, there is proposed an aplanatic holographic lens for a collimating lens or an objective lens shown in FIGS. 37 and 38 in which a hologram is formed between at least two laser glass lenses. (I. Weingartner, SPIE. Proceedings, 396 (1983) 173, Optik, 68, No. 2 (1984) 185–190.) In this disclosure, curvatures R1 and R2 and refractive indexes of optical glass lenses 462 and 472 are designed to satisfy the sine condition to eliminate a remaining spherical aberration by holograms 461 and 471.

The one proposed by W. T. Welford has a hologram formed on a curved surface but not on a plane plate so that it will be difficult to fabricate. Moreover, only an in-line type in which an optical axis of the holographic lens coincides with an optical axis of an incident wave can be formed, but an off-axis type cannot be formed easily. On the other hand, the one shown in FIG. 38 has the hologram 471 formed on a plane plate. However, a concrete technique how to fabricate the hologram is not disclosed therein, but only indicating that the hologram may be formed theoretically by an electronic beam drawing and a computer drawing so that it is not practical. Particularly in a holographic lens which uses a semiconductor laser as its beam source, a difference between a wavelength for constructing the hologram and a wavelength for reconstructing the hologram shall be considered. However, the above prior arts do not disclose the hologram fabricating methods which take into account such a matter. Further, even if the hologram is formed on a plane plate of a lens, at least two lenses are required.

Further, these prior arts do not explain about the construction of hologram by a holographic exposure, and do not realize the off-axis type.

To solve the above problems, an object of this embodiment is to provide a concrete method for fabricating the aberration corrected holographic lens for the scanning holographic lens achieving a wide image circle in which a hologram is formed on a flat plate to which an optical spherical lens is brought closely, or the hologram is constructed on the spherical lens.

To eliminate the above problem, the embodiment is provided with a hologram forming optical spherical element and a conjugate wave generating means such as a telescopic system to generate a reference wave of a hologram.

According to the above arrangement, a laser beam having a wavelength of $\lambda_1$ which is shorter than a wavelength $\lambda_2$ of a reconstruction wave from a semiconductor laser is made incident into the optical spherical element to generate a necessary aberration wave. The aberration wave has a wave front for correcting an aberration generated at the time of reconstruction by the reconstruction optical spherical element and a wave front for correcting an aberration corresponding to a difference between the reconstruction wavelength and the constructing wavelength. The aberration wave thus formed is passed through the conjugate wave generating means such as a telescopic system to generate a conjugate wave. The conjugate wave is guided as a reference wave of a constructing wave to a hologram forming surface of a plate hologram. Accordingly, a gap between the spherical element and the hologram forming material surface is enlarged to make incident an objective wave easily.

The embodiment of the present invention will be described in detail.

Description of the Hologram Fabricating Method of the Invention

Figure 20:
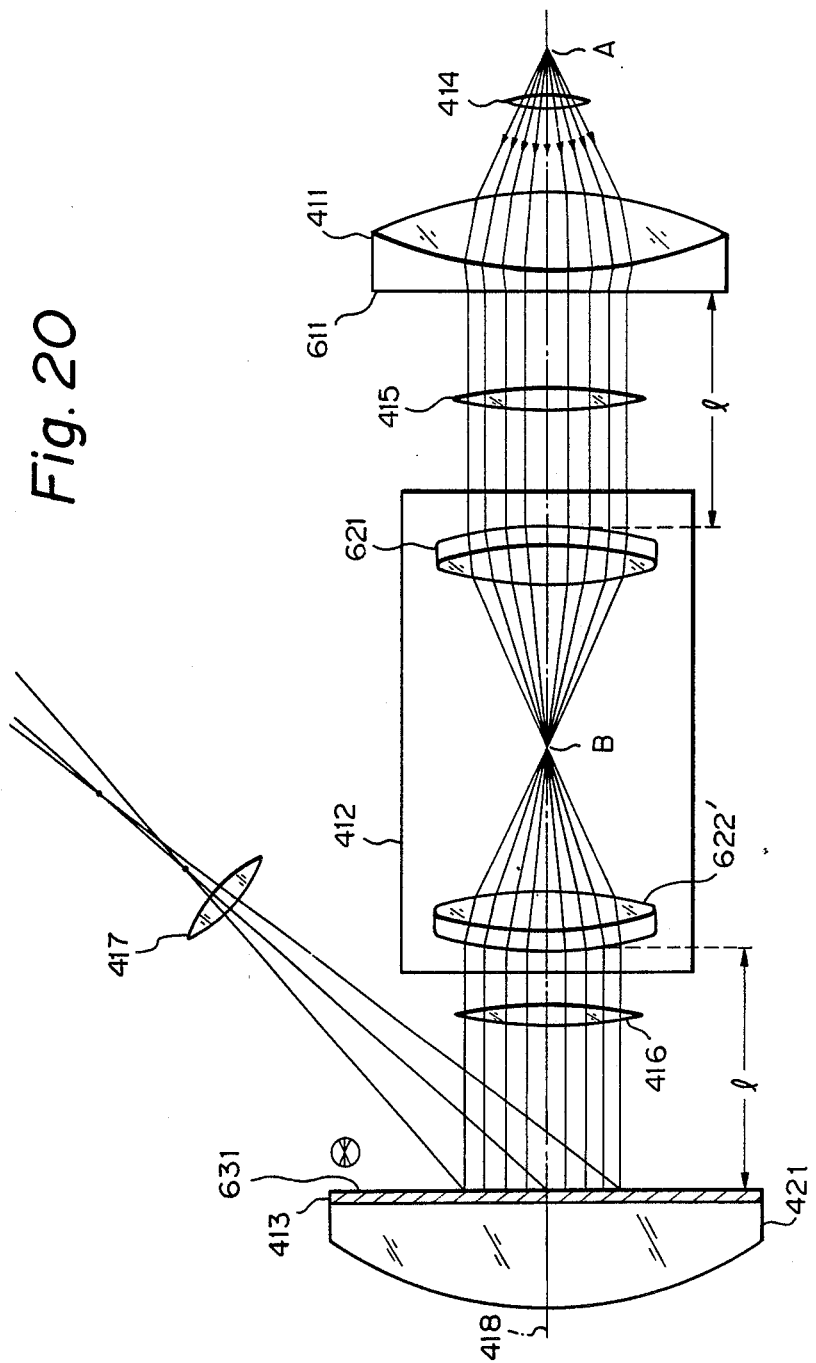
FIG. 20 is a view showing the constitution of an embodiment of a method for fabricating a hologram according to the present invention.

FIG. 20 is a view showing the constitution of a hologram fabricating method of this embodiment. A reconstruction wave (to be described later) of a hologram 413 is a semiconductor beam which wavelength $\lambda_2$ is about 787 nm. In construction of the hologram shown in FIG. 20, a laser beam having a wavelength of $\lambda_1$ which is shorter than the reconstruction wave is used as a construction wave. Such a laser beam is an Ar laser beam in which $\lambda_1 = 488$ nm.

In FIG. 20, a divergent laser beam 414 of wavelength $\lambda_1$ irradiated from an outgoing point A on an optical axis 418 is made incident into a correcting lens 411 and 611 to generate an aberration wave 415 which is made incident to a lens 621 in a telescopic system 412. The aberration wave 415 is converged at a convergent point B on the optical axis 418 and irradiated as a conjugate wave 416 through a lens 622' to be guided toward a hologram forming material surface 431. The two lenses 621 and 622' in the telescopic system 412 are the same and arranged symmetrically with respect to the convergent point B. A distance between an outgoing surface 611 of the aberration correcting lens 411 and the lens 621 is l, and a distance between the hologram forming material surface 631 and the lens 622' is also l.

On the other hand, an aberration corrected wave for a scanning holographic lens 417 of wavelength $\lambda_1$ as an objective wave 417 is guided toward the holographic forming material surface 631.

Principle of Hologram Fabricating Method of the Invention

Figure 22:
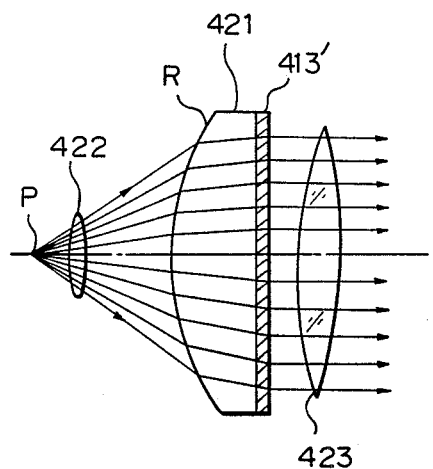
FIG. 22 is a view showing the constitution of a hybrid holographic lens.

The principle of the above embodiment will be described sequentially. At first, to make this embodiment be easily understood, the holographic lens as follows will be discussed. FIG. 22 is a view showing the constitution of a hybrid holographic lens adopting the hologram 413' which can be fabricated by converting a divergent wave 422 into a vertical plane wave 423 ($\lambda_2$). In FIG. 22, the hologram 413' formed on the flat plate glass is brought close to an optical glass lens 421, or formed on the glass lens 421. A reconstruction wave irradiated from an outgoing point p is a divergent wave 422 of a semiconductor laser having a wavelength of $\lambda_2$, for instance $\lambda_2 = 787$ nm. The divergent wave 422 is converted into a vertical plane wave 423 by the optical glass lens 421 and the hologram 413'. A curvature R, a lens thickness, a refractive index, and an spherical aberration necessary for the hologram 413' of the leans 421 are determined to satisfy the sine condition to enlarge image circle. Namely, it has been found that the sine condition can be satisfied only by the hologram 413 and the single lens 421.

Figure 26:
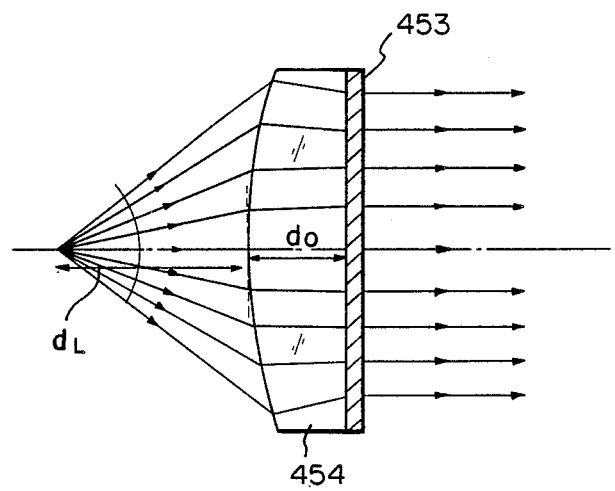
FIG. 26 is a view showing the constitution of a plane-convex lens according to the present invention.

For instance, a hybrid holographic lens as shown in FIG. 26 satisfying the sine condition and comprising a hologram 453 for converting a divergent wave of a semiconductor laser into a plane wave, and a plane-convex lens 454 is made. If lens parameters are optimized, the sine condition is satisfied under a ray tracing state shown in FIG. 26.

As an example, a beam source is a semiconductor laser of 787 nm; a refractive index of the plane-convex lens 1.76574; a lens center thickness do 12.6 mm; a lens curvature 12.5 mm; and a distance from the spot beam source to the lens center $d_L = 10$ mm. A focal length is 12.765 mm.

Figure 27:
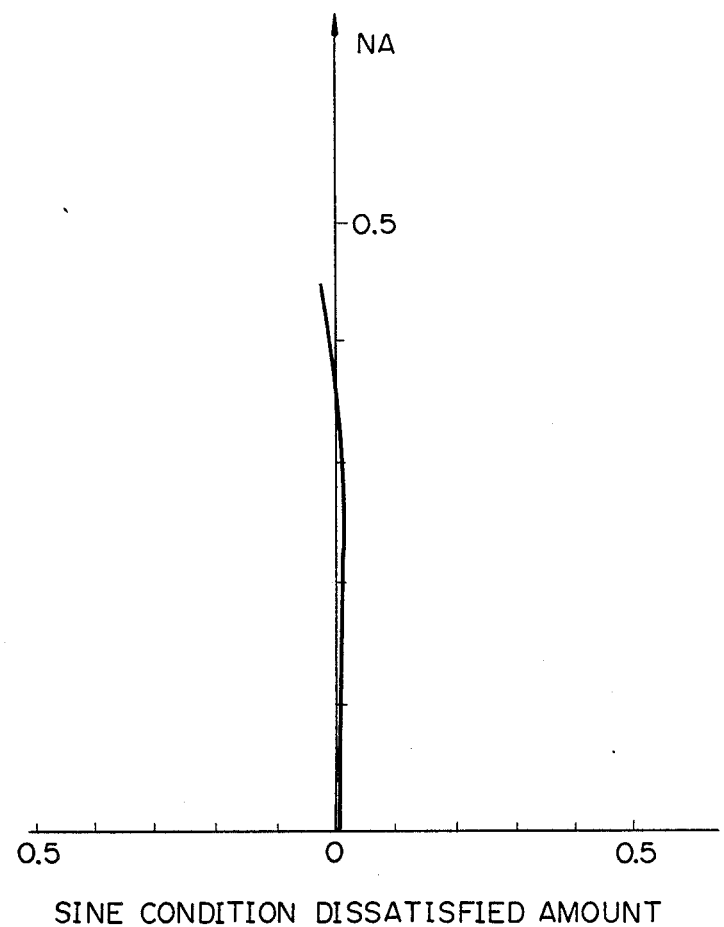
FIG. 27 is a view showing a sine condition unsatisfying amount.

An unsatisfied amount of the sine condition is maximum 23 $\mu$m with the NA being within 0.45 as shown in FIG. 27 so that a good sine condition may be obtained. In a normal plate holographic lens, this reaches even to 1 mm.

According to the above, a hybrid holographic lens to enlarge an image circle is realized.

To satisfy the sine condition, the hologram is required to convert a complicated spherical aberration passed through a lens into a plane wave.

Figure 23:
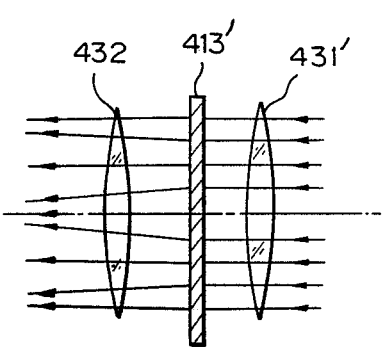
FIGS. 23(a) and (b) are views explaining an aberration by a hologram at a reconstruction wavelength.
Figure 23:
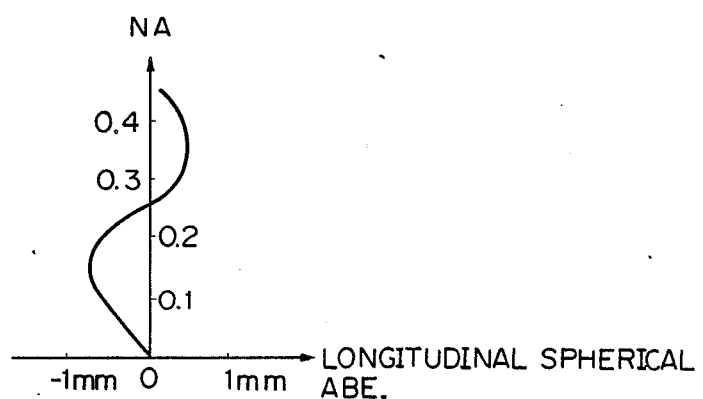

In the above hybrid holographic lens, if a plane wave 431 of wavelength $\lambda_2$ is made incident from the right side of FIG. 26 only into the hologram 413' (the same as 453 in FIG. 26) as shown in FIG. 23(a), an outgoing beam to be generated is a spherical aberration wave 432. In other words, it will be considered that the spherical aberration wave 432 is generated by the optical glass lens 454 shown in FIG. 26, and the hologram 413' corrects its aberration and changes it into the plane wave 431'. Therefore, for fabricating the hologram 413', an aberration wave same as the spherical aberration wave 432 is required as an reference wave. To eliminate a spherical aberration generated by the optical glass lens 432 (FIG. 23(a)) to satisfy the sine condition, a longitudinal spherical aberration wave as an reference wave which becomes a higher order function with respect to the NA (aperture) shown in FIG. 23(b) is required. Moreover, a laser beam having a shorter wavelength $\lambda_1$ (for instance, an Ar laser beam of $\lambda_1 = 488$ nm) shall be used as the construction wave. In considering the above, the hologram 413' is formed by irradiating a spherical aberration wave 441 which has a wavelength of $\lambda_1$ with the characteristics shown in FIG. 24(b), as a reference wave onto a hologram forming material surface 631 as shown in FIG. 24(a). Namely, in addition to the spherical aberration shown in FIG. 23, a spherical aberration caused by a difference between the reconstruction wavelength and the construction wavelength is required as the reference wave 441. Here, an objective wave 442 is a plane wave of wavelength $\lambda_1$.

A method for generating the reference wave 441 with wavelength $\lambda_1$ shown in FIG. 24(a) will be described hereunder.

Figure 25:
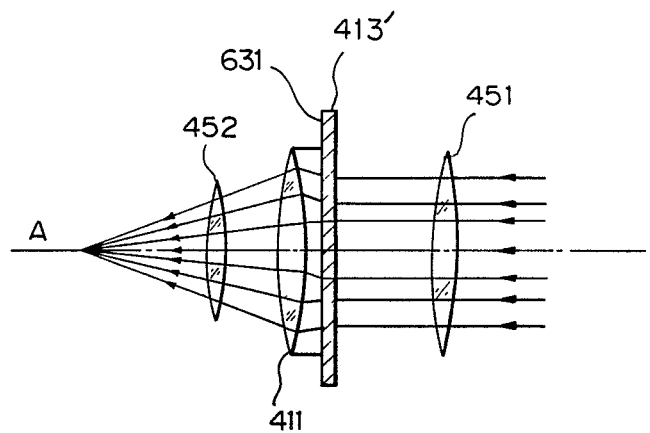
FIG. 25 is a view explaining the principle of an aberration correction.

Supposing a plane wave 451 of wavelength $\lambda_1$ is made incident as shown in FIG. 25 into the hologram 413' as shown in FIG. 24(a). As a result, a diffracted wave is generated to have the same aberration as that of the reference wave 441 shown in FIG. 24(a). The aberration can sufficiently be corrected by, for instance, an achromatic lens 411 brought close to the hologram 413' as shown in FIG. 25 so that a convergent wave 452 with almost no aberration can be converged to a point A. In other words, if a divergent beam with wavelength $\lambda_1$ from the point A is made incident into the achromatic lens, it becomes an aberration wave which is the same as the reference wave 441 shown in FIG. 24(a), on a hologram surface 631. Since the achromatic lens 411 and a hologram 413' are located closely to each other in FIG. 25, the any object wave 442 shown in FIG. 24(a) cannot be made incident.

Therefore, the telescopic system shown in FIG. 20 is introduced. In FIG. 20, the aberration correcting lens 411 has the same function as that of the lens shown in FIG. 25. The divergent wave 414 of wavelength $\lambda_1$ from the outgoing point A generates on an outgoing surface 611 the aberration wave 415 having the same aberration as that of the reference wave 441 shown in FIG. 24(a). To achieve the above, the aberration correcting lens 411 is optimally designed by ray tracing. In FIG. 20, the magnitude of telescopic system 412 is "1" as apparent from the above description. A distance between the outgoing surface 611 of the aberration correcting lens 411 and the lens 621 is 1, and a distance between the hologram forming material surface 631 and the lens 622' is also 1 so that a wave front of the aberration wave 415 at the outgoing surface 611 and a wave front of the conjugate wave 416 at the hologram forming material surface 631 become to be conjugate to each other to have the same aberration, thereby generating an reference wave having a required aberration on the hologram forming material surface 631. As a result, a gap between the telescopic system 412 and the hologram forming material surface 631 can be enlarged so that the object wave can be made incident easily.

This method has an advantage that the objective wave can select an optional wave front. The aberration corrected hybrid holographic lens for the scanning holographic lens will be discussed. To obtain this, the object wave should be an aberration corrected wave 417 in FIG. 20 which wave is the same as 305 in FIG. 18.

Figure 21:
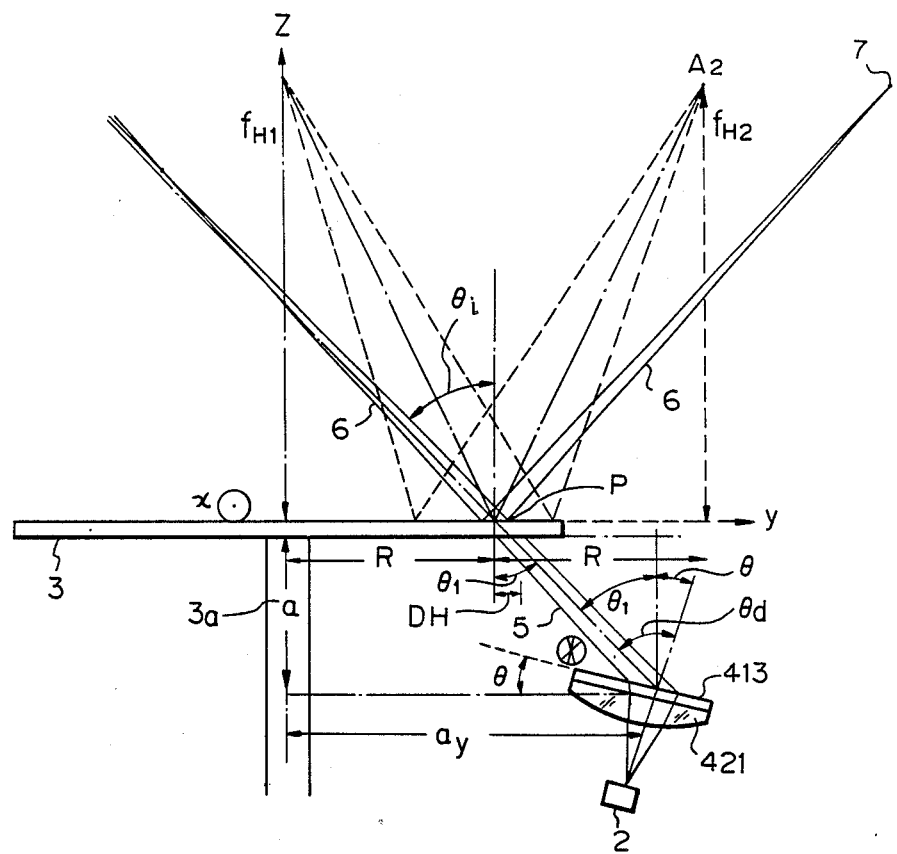
FIG. 21 is a side view of a scanner using the correcting holographic lens fabricated by the method of FIG. 20.

As the F number of this object wave is large, a shift from the sine condition subject that an object beam is infinite is considered to be very small, so that the effect of the present method will be excellent. To obtain the laser beam scanner, the design is shown in FIG. 21.

Although the method has been applied to the plane-convex lens in the above embodiment, the method is applicable to other spherical lenses.

We claim:

1. A laser beam scanner apparatus comprising:
   a beam source for generating a semiconductor laser beam having a first wavelength;
   a rotary hologram with variable spatial frequency for diffracting said semiconductor laser beam to form a scanning beam on a surface to be scanned;
   a light source and lens for generating a spherical object wave having an aberration and a second wavelength shorter than said first wavelength; and
   an aberration correcting stationary hologram formed on a stationary hologram substrate by construction beams having a wavelength shorter than a reconstruction beam, said aberration correcting stationary hologram being disposed between said beam source and said rotary hologram and said construction beam including the object wave, which is inclined at a non-vertical angle with respect to the stationary hologram substrate, and a reference wave which interfere on the stationary hologram substrate, so that the laser beam diffracted through said aberration correcting stationary hologram, in which a wave having a predetermined aberration is recorded, has a predetermined aberration by which an aberration of said scanning beam on the surface to be scanned shall be corrected, wherein said semiconductor laser beam diverged from said beam source irradiates said stationary hologram directly, and
   wherein said reference wave is a spherical wave having a required aberration.

2. An apparatus as claimed in claim 1, wherein said required aberration is formed by a convex lens disposed in an optical path of said spherical wave.

3. An apparatus as claimed in claim 1, wherein said semiconductor laser beam diverging from said beam source irradiates said stationary hologram through an optical lens which converts said semiconductor laser beam into a plane wave.

4. An apparatus as claimed in claim 3, wherein said reference wave for constructing the halogram is a plane wave.

5. An apparatus as claimed in claim 3 or 4, wherein said object wave for forming the hologram is a divergent spherical wave having an aberration.

6. An apparatus as claimed in claim 1, wherein said stationary hologram is inclined with respect to said rotary hologram for scanning.

7. An apparatus as claimed in any one of claims 1 and 2 to 6, wherein said object wave for constituting the hologram is a convergent spherical wave having a predetermined aberration which is made incident to the hologram substrate through a concave lens.

8. An apparatus as claimed in claim 1, wherein said aberration for the entire scanning region of said scanning beam is uniformly corrected.

9. An apparatus as claimed in claim 1, wherein said object wave for forming the hologram is a divergent spherical wave having an aberration.

10. An apparatus as claimed in claim 13, wherein said object wave is a divergent spherical wave having a predetermined aberration which is passed through a convex lens.

11. An apparatus as claimed in claim 1, wherein said reference wave for constructing the hologram is a convergent spherical wave having an aberration.

12. An apparatus as claimed in claim 11 wherein said reference wave is a convergent spherical wave having a predetermined aberration which is made incident to the hologram substrate through a concave lens.

13. An apparatus as claimed in claim 1, wherein a position of said beam source of the semiconductor laser beam is adjustable with respect to said stationary hologram in an optical axis direction.

14. An apparatus as claimed in claim 1, wherein said stationary hologram is fabricated such that a shift of an incident position of the diffracted beam to said rotary hologram is brought within a predetermined extent with respect to a specified variation of wavelength of said semiconductor laser beam.

15. A laser beam scanner apparatus comprising:
a beam source for generating a semiconductor laser beam;
a rotary hologram with variable spatial frequency for diffracting said semiconductor laser beam to form a scanning beam on a surface to be scanned; and
an aberration correcting stationary hologram disposed between said beam source and said rotary hologram, wherein said stationary hologram is constructed with an object wave and a reference wave which interfere with each other on a stationary hologram substrate, so that the laser beam diffracted through said aberration correcting stationary hologram, in which a wave having a predetermined aberration is recorded, has a predetermined aberration which corrects an aberration of said scanning beam on the surface to be scanned, said object wave being a spherical wave having an aberration, a wave length shorter than that of said semiconductor laser beam, and an incident angle which is inclined with respect to said stationary hologram substrate,
wherein said stationary hologram is inclined with respect to said rotary hologram for scanning, and
said stationary hologram is inclined with respect to said rotary hologram by an angle with which a positional shift of said scanning beam due to the variation of wavelength is prevented.

16. A laser beam scanner apparatus comprising:
a beam source for generating a semiconductor laser beam;
a rotary hologram with variable spatial frequency for diffracting said semiconductor laser beam to form a scanning beam on a surface to be scanned; and
an aberration correcting stationary hologram disposed between said beam source and said rotary hologram, wherein said stationary hologram is constructed with an object wave and a reference wave which interfere with each other on a stationary hologram substrate, so that the laser beam diffracted through said aberration correcting stationary hologram, in which a wave having a predetermined aberration is recorded, has a predetermined aberration which corrects an aberration of said scanning beam on the surface to be scanned, said object wave being a spherical wave having an aberration, a wave length shorter than that of said semiconductor laser beam, and an incident angle which is inclined with respect to said stationary hologram substrate,
wherein said semiconductor laser beam diverged from said beam source irradiates said stationary hologram directly,
said reference wave is a spherical wave having a required aberration, and
said reference wave for fabricating the hologram has an astigmatism and a predetermined aberration.

17. An apparatus as claimed in claim 16, wherein said astigmatism of the reference wave is formed by using a cylindrical lens.

18. A laser beam scanner apparatus comprising:
a beam source for generating a semiconductor laser beam;
a rotary hologram with variable spatial frequency for diffracting said semiconductor laser beam to form a scanning beam on a surface to be scanned; and
an aberration correcting stationary hologram disposed between said beam source and said rotary hologram, wherein said stationary hologram is constructed with an object wave and a reference wave which interfere with each other on a stationary hologram substrate, so that the laser beam diffracted through said aberration correcting stationary hologram, in which a wave having a predetermined aberration is recorded, has a predetermined aberration which corrects an aberration of said scanning beam on the surface to be scanned, said object wave being a spherical wave having an aberration, a wave length shorter than that of said semiconductor laser beam, and an incident angle which is inclined with respect to said stationary hologram substrate,
wherein said stationary hologram is inclined with respect to said rotary hologram for scanning, and
said stationary hologram is fabricated on a plane side of a plane-convex lens.

19. An apparatus as claimed in any one of claims 1, 9, and 10 and 18, wherein said reference wave for fabricating the hologram is a divergent spherical wave which is passed through an aberration correcting lens to have a required aberration, said wave with the aberration being changed to a conjugate wave through a telescopic optical system, and said conjugate wave being made incident to the hologram substrate.

20. A laser beam scanner apparatus comprising:
a beam source for generating a semiconductor laser beam;
a rotary hologram with variable spatial frequency for diffracting said semiconductor laser beam to form a scanning beam on a surface to be scanned; and
an aberration correcting stationary hologram disposed between said beam source and said rotary hologram, wherein said stationary hologram is constructed with an object wave and a reference wave which interfere with each other on a stationary hologram substrate, so that the laser beam diffracted through said aberration correcting stationary hologram, in which a wave having a predetermined aberration is recorded, has a predetermined aberration which corrects an aberration of said scanning beam on the surface to be scanned, said object wave being a spherical wave having an aberration, a wave length shorter than that of said semiconductor laser beam, and an incident angle which is inclined with respect to said stationary hologram substrate,
wherein said stationary hologram is fabricated such that a shift of an incident position of the diffracted beam to said rotary hologray is brought within a predetermined extent with respect to a specified variation of wavelength of said semiconductor laser beam wherein said semiconductor laser beam diverging from said beam source irradiates said stationary hologram through an optical lens which converts said semiconductor laser beam into a plane wave.

21. A method for forming a laser beam scanner which comprises a beam source for generating a semiconductor laser beam, a rotary hologram for diffracting said semiconductor laser beam to form a scanning beam on a surface to be scanned, and an aberration correcting stationary hologram disposed between said beam source and said rotary hologram, wherein said stationary hologram is constructed with an object wave and a reference wave being interfered on a stationary hologram substrate subject that an aberration of said scanning beam on said surface to be scanned shall be corrected, said object wave being a spherical wave having an aberration, a wavelength shorter than that of said semiconductor laser beam, and an incident angle which is not vertical but inclined with respect to said stationary hologram substrate.

22. A laser beam scanner apparatus comprising:
a beam source for generating a semiconductor laser beam having a first wave length;
a rotary hologram with variable spatial frequency for diffracting said semiconductor laser beam to form a scanning beam on a surface to be scanned;
a light source and lens for generating a spherical object wave having an aberration and a second wavelength shorter then said first wavelength; and
an aberration correcting stationary hologram formed on an stationary hologram substrate, said aberration correcting stationary hologram being disposed between said beam source and said rotary hologram and being constructed with the object wave, which is inclined at a non-vertical angle with respect to the stationary hologram substrate, and a reference wave which interfere on the stationary hologram substrate, so that the laser beam diffracted through said aberration correcting stationary hologram, in which a wave having a predetermined aberration is recorded, has a predetermined aberration by which an aberration of said scanning beam on the surface to be scanned shall be corrected, wherein said semiconductor laser beam diverging from said beam source irradiates said stationary hologram through an optical lens which converts said semiconductor laser beam into a plane wave.

23. An apparatus as claimed in claim 22, wherein said stationary hologram is inclined with respect to said rotary hologram for scanning.

24. An apparatus as claimed in claim 23, wherein said stationary hologram is inclined with respect to said rotary hologram by an angle with which a positional shift of said scanning beam due to the variation of wavelength is prevented.

25. An apparatus as claimed in claim 22, wherein said stationary hologram is fabricated such that a shift of an incident position of the diffracted beam to said rotary hologram is brought within a predetermined extent with respect to a specified variation of wavelength of said semiconductor laser beam.

26. A laser beam scanner apparatus comprising:
a beam source for generating a semiconductor laser beam having a first wave length;
a rotary hologram with variable spatial frequency for diffracting said semiconductor laser beam to form a scanning beam on a surface to be scanned;
a light source and lens for generating a spherical object wave having an aberration and a second wavelength shorter then said first wavelength; and
an aberration correcting stationary hologram formed on an stationary hologram substrate, said aberration correcting stationary hologram being disposed between said beam source and said rotary hologram and being constructed with the object wave, which is inclined at a non-vertical angle with respect to the stationary hologram substrate, and a reference wave which interfere on the stationary hologram substrate, so that the laser beam diffracted through said aberration correcting stationary hologram, in which a wave having a predetermined aberration is recorded, has a predetermined aberration by which an aberration of said scanning beam on the surface to be scanned shall be corrected, wherein said object wave for constructing the hologram is a convergent spherical wave having a predetermined aberration which is made incident to the hologram substrate through a concave lens.

27. A laser beam scanner apparatus comprising:
a beam source for generating a semiconductor laser beam having a first wave length;
a rotary hologram with variable spatial frequency for diffracting said semiconductor laser beam to form a scanning beam on a surface to be scanned;
a light source and lens for generating a spherical object wave having an aberration and a second wavelength shorter then said first wavelength; and
an aberration correcting stationary hologram formed on an stationary hologram substrate, said aberration correcting stationary hologram being disposed between said beam source and said rotary hologram and being constructed with the object wave, which is inclined at a non-vertical angle with respect to the stationary hologram substrate, and a reference wave which interfere on the stationary hologram substrate, so that the laser beam diffracted through said aberration correcting stationary hologram, in which a wave having a predetermined aberration is recorded, has a predetermined aberration by which an aberration of said scanning beam on the surface to be scanned shall be corrected, wherein said reference wave for fabricating the hologram is a divergent spherical wave which is passed through an aberration correcting lens to have a required aberration, said wave with the aberration being changed to a conjugate wave through a telescopic optical system, and said conjugate wave being made incident to the hologram substrate.

28. A laser beam scanner apparatus comprising:
a beam source for generating a semiconductor laser beam having a first wave length;
a rotary hologram with variable spatial frequency for diffracting said semiconductor laser beam to form a scanning beam on a surface to be scanned;
a light source and lens for generating a spherical object wave having an aberration and a second wavelength shorter then said first wavelength; and an aberration correcting stationary hologram formed on an stationary hologram substrate, said aberration correcting stationary hologram being disposed between said beam source and said rotary hologram and being constructed with the object wave, which is inclined at a non-vertical angle with respect to the stationary hologram substrate, and a reference wave which interfere on the stationary hologram substrate, so that the laser beam diffracted through said aberration correcting stationary hologram, in which a wave having a predetermined aberration is recorded, has a predetermined aberration by which an aberration of said scanning beam on the surface to be scanned shall be corrected, wherein a position of said beam source of the semiconductor laser beam is adjustable with respect to said stationary hologram in an optical axis direction.

29. A laser beam scanner apparatus comprising:
a beam source for generating a semiconductor laser beam having a first wave length;
a rotary hologram with variable spatial frequency for diffracting said semiconductor laser beam to form a scanning beam on a surface to be scanned;
a light source and lens for generating a spherical object wave having an aberration and a second wavelength shorter then said first wavelength; and
an aberration correcting stationary hologram formed on an stationary hologram substrate, said aberration correcting stationary hologram being disposed between said beam source and said rotary hologram and being constructed with the object wave, which is inclined at a non-vertical angle with respect to the stationary hologram substrate, and a reference wave which interfere on the stationary hologram substrate, so that the laser beam diffracted through said aberration correcting stationary hologram, in which a wave having a predetermined aberration is recorded, has a predetermined aberration by which an aberration of said scanning beam on the surface to be scanned shall be corrected, wherein said reference wave for constructing the hologram is a convergent spherical wave having an aberration, and
wherein said reference wave is a convergent spherical wave having a predetermined aberration which is made incident to the hologram substrate through a concave lens.

* * * * *